(12) United States Patent
Kato et al.

(10) Patent No.: US 10,275,882 B2
(45) Date of Patent: Apr. 30, 2019

(54) OBSERVATION APPARATUS, MEASUREMENT SYSTEM AND OBSERVATION METHOD

(71) Applicant: OLYMPUS CORPORATION, Hachioji-shi, Tokyo (JP)

(72) Inventors: Shigeru Kato, Tachikawa (JP); Tsuyoshi Yaji, Kawagoe (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 110 days.

(21) Appl. No.: 15/463,809

(22) Filed: Mar. 20, 2017

(65) Prior Publication Data
US 2017/0278240 A1    Sep. 28, 2017

(30) Foreign Application Priority Data
Mar. 23, 2016    (JP) .................................. 2016-058425

(51) Int. Cl.
| | |
|---|---|
| *G06T 7/00* | (2017.01) |
| *G06K 9/46* | (2006.01) |
| *H04N 7/18* | (2006.01) |
| *G01B 11/00* | (2006.01) |

(52) U.S. Cl.
CPC .......... *G06T 7/0012* (2013.01); *G01B 11/002* (2013.01); *G06K 9/4604* (2013.01); *H04N 7/183* (2013.01); *G06T 2207/30024* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 2012/0081532 A1* | 4/2012 | Kumai | A61B 1/042 348/77 |
| 2013/0044234 A1* | 2/2013 | Nagano | H04N 5/23212 348/222.1 |
| 2013/0330848 A1* | 12/2013 | Minato | H01L 21/6838 438/16 |
| 2016/0295187 A1* | 10/2016 | Sano | H04N 9/3194 |

FOREIGN PATENT DOCUMENTS

JP    2005-295818    10/2005

\* cited by examiner

*Primary Examiner* — Delomia L Gilliard
(74) *Attorney, Agent, or Firm* — John C. Pokotylo; Pokotylo Patent Services

(57) ABSTRACT

An observation apparatus includes an imaging unit, a driving mechanism, an operation circuit and a control circuit. The imaging unit generates image data by imaging a target object. The driving mechanism moves the imaging unit to change an imaging position of the target object. The operation circuit calculates information on imaging conditions of the imaging unit based on an auxiliary information calculation image, which is image data of auxiliary information calculation light. The control circuit controls the imaging performed by the imaging unit, using the information on the imaging conditions.

10 Claims, 15 Drawing Sheets

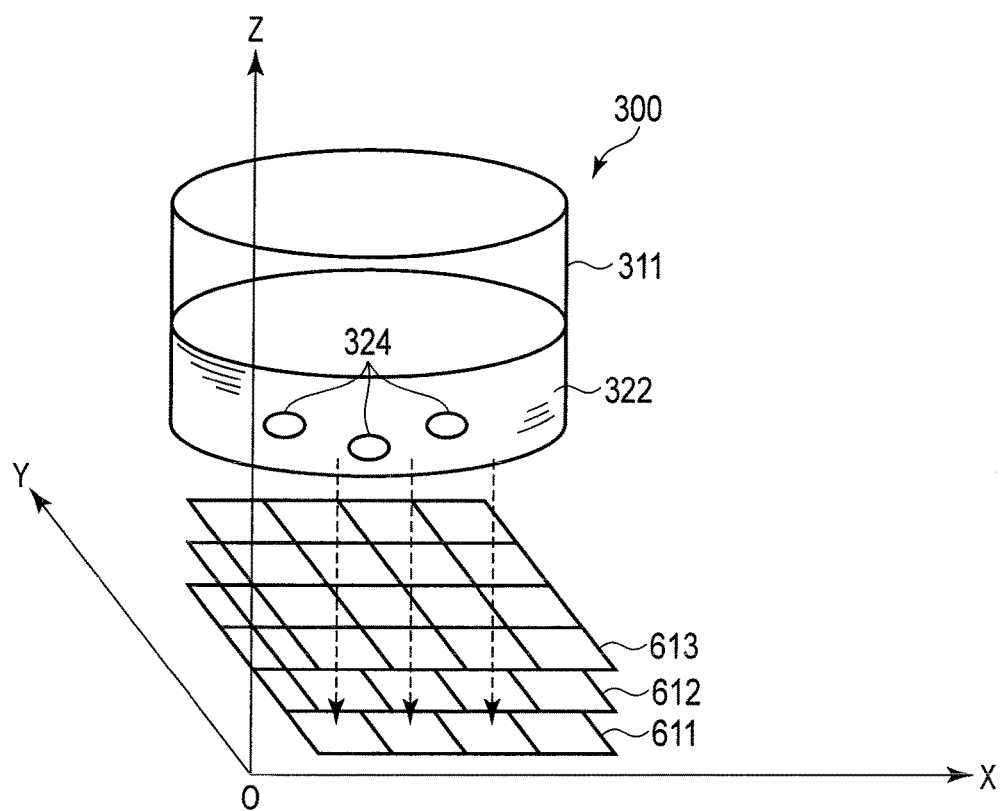
F I G. 8

OBSERVATION APPARATUS, MEASUREMENT SYSTEM AND OBSERVATION METHOD

CROSS-REFERENCE TO RELATED APPLICATIONS

This application is based upon and claims the benefit of priority from prior Japanese Patent Application No. 2016-058425, filed Mar. 23, 2016, the entire contents of which are incorporated herein by reference.

BACKGROUND OF THE INVENTION

1. Field of the Invention

The present invention relates to an observation apparatus, a measurement system and an observation method.

2. Description of the Related Art

In general, an apparatus wherein a culture vessel is statically placed in an incubator and images of cultured cells or the like in the culture vessel are taken, is known in the art. For example, Jpn. Pat. Appln. KOKAI Publication No. 2005-295818 discloses a technique related to an apparatus which takes a number of images while moving a camera (imaging unit) inside an incubator so as to take images of cells existing in a wide range of a culture vessel.

BRIEF SUMMARY OF THE INVENTION

According to one aspect of the present invention, an observation apparatus acquires an observation image, which is image data of observation light used for observation of a target object. The observation apparatus comprises: an imaging unit which performs imaging and generating (i) an auxiliary information calculation image, which is image data of auxiliary information calculation light, and (ii) the observation image; a driving mechanism which moves the imaging unit to change an imaging position of the target object; an operation circuit which calculates information regarding imaging conditions of the imaging unit, based on the auxiliary information calculation image taken under different conditions from those of the observation image; and a control circuit which controls the imaging performed by the imaging unit, using information on the imaging conditions.

According to another aspect of the present invention, a measurement system comprises an observation apparatus which includes such elements as described above and which further include a communication device; and a controller which communicates with the observation apparatus via the communication device and controls an operation of the observation apparatus.

According to still another aspect of the present invention, an observation method comprises: causing an imaging unit to perform imaging and generating (i) an observation image, which is image data of observation light, and (ii) an auxiliary information calculation image, which is image data of auxiliary information calculation light; moving the imaging unit to change an imaging position of a target object; calculating information regarding imaging conditions of the imaging unit, based on the auxiliary information calculation image taken under different conditions from those of the observation image; and controlling the imaging performed by the imaging unit, using information on the imaging conditions.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic diagram illustrating an example of how a measurement system of the first embodiment looks like.

FIG. 8 is an explanatory diagram illustrating image acquisition performed by the observation apparatus of the first embodiment.

DETAILED DESCRIPTION OF THE INVENTION

First Embodiment

The first embodiment of the present invention will now be described with reference to the accompanying drawings. The measurement system of the present embodiment is a system which takes images of a cell, a cell group and a tissue which are being cultured, and which makes a record of the numbers of cells or cell groups and the morphology thereof. Taking images is intended to mean photographing a target object or imaging thereof, and the images obtained thereby may be still images or videos.

<Configuration of Measurement System>

Figure 1:
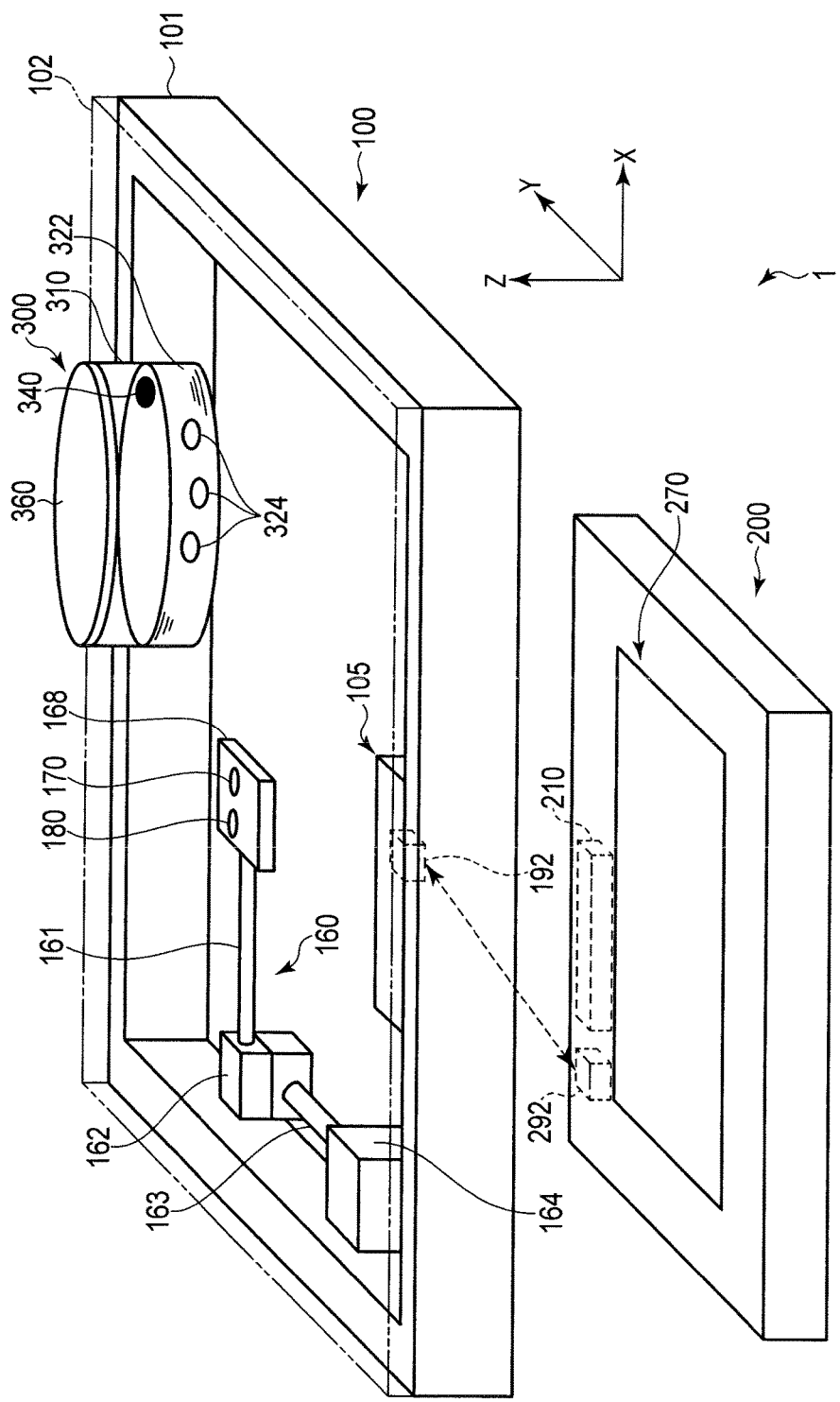
Figure 2:
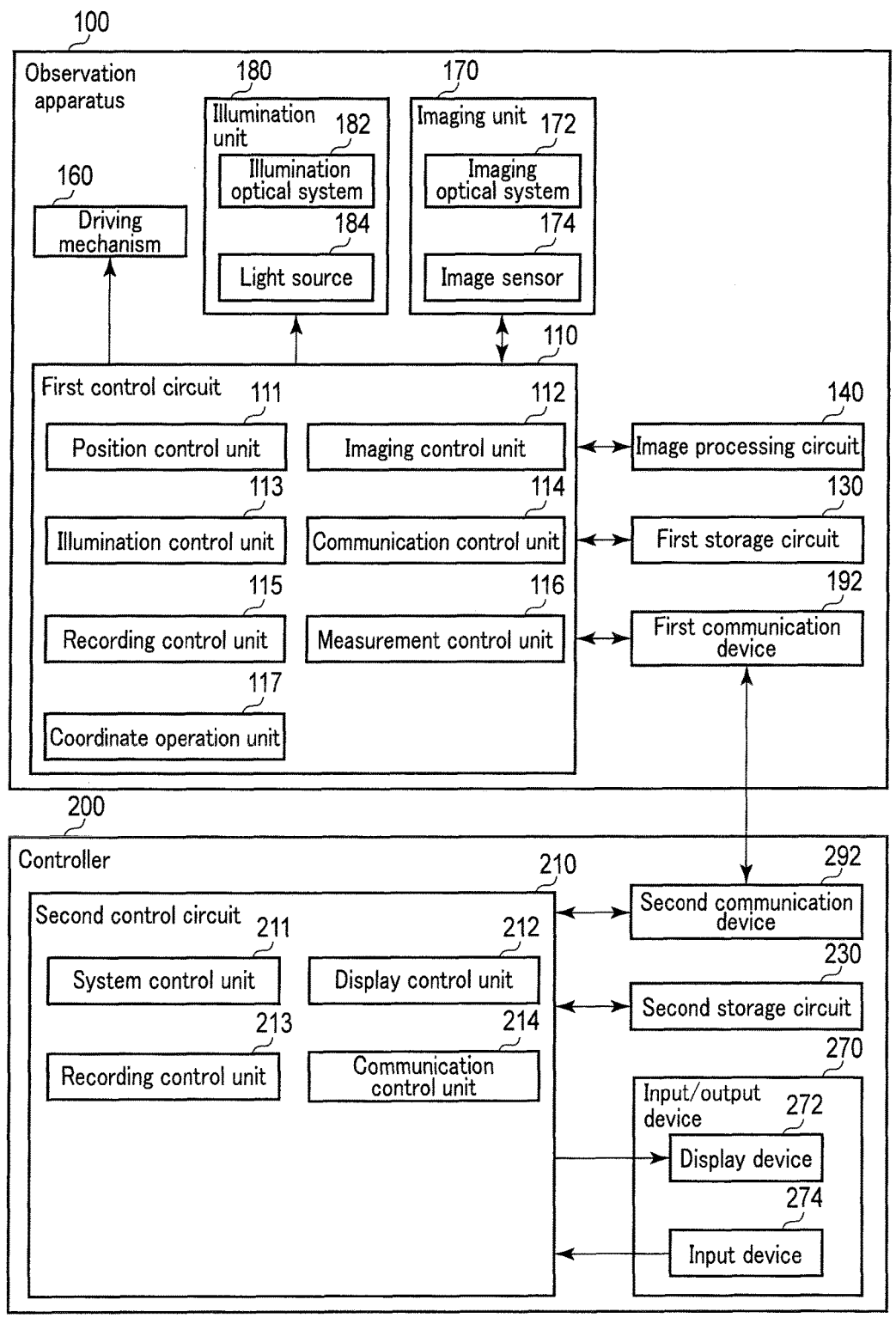
FIG. 2 is a block diagram schematically illustrating an exemplary configuration of the measurement system of the first embodiment.

FIG. 1 is a schematic diagram schematically illustrating how the measurement system 1 looks like. FIG. 2 is a block diagram illustrating an exemplary configuration of the measurement system 1. The measurement system 1 comprises an observation apparatus 100 and a controller 200. As shown in FIG. 1, the observation apparatus 100 is substantially shaped like a plate. The observation apparatus 100 is provided, for example, inside an incubator, and a sample 300 to be observed is arranged on top of the observation apparatus 100. For the sake of explanation, an x-axis and a y-axis perpendicular to each other are defined in a plane parallel to the surface of the observation apparatus 100 on which the sample 300 is placed, and a z-axis is defined as an axis perpendicular to both the x-axis and the y-axis. A transparent plate 102 is placed as a top plate of the observation apparatus 100, and an imaging unit 170 is provided inside the casing 101 of the observation apparatus 100. The observation apparatus 100 takes an image of the sample 300, with the transparent plate 102 interposed, and the image of the sample 300 is acquired thereby. On the other hand, the controller 200 is provided on the outside of the incubator. The observation apparatus 100 and the controller 200 communicate with each other. The controller 200 controls the observation apparatus 100.

(Sample)

An example of the sample 300 to be observed by the measurement system 1 will be described. A culture medium 322 is in the vessel 310, and cells 324 are cultured in the culture medium 322. The vessel 310 is, for example, a petri dish, a culture flask, a multiwell plate, or the like. The vessel 310 is, for example, a culture vessel for culturing a biological sample. The vessel 310 is not limited to any specific shape or size. The culture medium 322 may be either a liquid medium or a solid medium. The cells 324 to be measured may be either adhesive cells or floating cells. Alternatively, the cells 324 may be spheroids or tissues. In addition, the cells 324 may be derived from any living substance or may be bacteria or the like. As described above, the sample 300 includes a living sample which is either the living substance itself or is derived from the living substance.

Where the culture medium 322 is a liquid medium, a buoy 340 may float on the culture medium 322. The buoy 340 serves as a mark for confirming the upper level of the culture medium 322. A reflecting plate 360 is on top of the vessel 310. The reflecting plate 360 reflects illumination light, described later.

(Observation Apparatus)

As shown in FIG. 1, a transparent plate 102 made of glass, for example, is on top of the casing 101 of the observation apparatus 100. The sample 300 is statically placed on this transparent plate 102. Although FIG. 1 shows that the top plate of the casing 101 is entirely transparent, the observation apparatus 100 may be designed such that part of the top plate of the casing 101 is a transparent plate, and the remaining part of the top plate is an opaque.

Various structural elements of the observation apparatus 100 are provided inside the casing 101. The interior of an incubator has, for example, a temperature of 37° C. and a humidity of 95%. Since the observation apparatus 100 is used in an environment of high ambient temperature and humidity, the casing 101 and the transparent plate 102 are designed have an air-tight structure.

A support member 168, which is inside the casing 101, is provided with an illumination unit 180 for illuminating the sample 300. The illumination unit 180 emits illumination light in the direction toward the transparent plate 102, namely, in the direction toward the sample 300. As shown in FIG. 2, the illumination unit 180 includes an illumination optical system 182 and a light source 184. The illumination light emitted from the light source 184 is made to travel to the sample 300 by the illumination optical system 182. As will be described in detail below, the illumination unit 180 emits visible light and infrared light in the present embodiment. In other words, the light source 184 includes a light source for emitting visible light and a light source for emitting infrared light. The light source 184 includes, for example, a light emitting diode (LED). Although the illumination unit 180 was described as being provided for the support member 168, what is required in practice is merely that the output end of the illumination optical system 182 is arranged in the support member 168. As long as this requirement is met, the light source 184 may be arranged at any position in the observation apparatus 100.

As shown in FIG. 1, an imaging unit 170 is provided in the neighborhood of the illumination unit 180 of the support member 168. The imaging unit 170 takes an image of the region where the sample 300 is present, and thus acquires an image of the sample 300. As shown in FIG. 2, the imaging unit 170 includes an imaging optical system 172 and an image sensor 174. The imaging unit 170 generates image data based on an image which is formed on the imaging plane of the image sensor 174 by the imaging optical system 172. The imaging optical system 172 is preferably a zoom optical system capable of changing its focal distance. In the present embodiment, the imaging unit 170 is configured to individually capture the visible light and infrared light emitted from the illumination unit 180 when the imaging unit 170 receives them.

Turning back to FIG. 1, a description will be continued. The support member 168 on which the imaging unit 170 and the illumination unit 180 are fixed is moved by a driving mechanism 160. The driving mechanism 160 is provided with an X feed screw 161 and an X actuator 162 for moving the support member 168 in the X-axis direction. The driving mechanism 160 is also provided with a Y feed screw 163 and a Y actuator 164 for moving the support member 168 in the Y-axis direction. The imaging unit 170 takes an image of only part of the sample 300 on the transparent plate 102 at a time. However, the imaging unit 170 is movable by the driving mechanism 160 and can therefore acquire an image of a wide range.

The imaging position in the Z-axis direction is changed by changing the focus position of the imaging optical system 172 in the direction of the optical axis. In other words, the imaging optical system 172 is provided with a focus adjustment mechanism for moving a focusing lens in the direction of the optical axis. In place of the focus adjustment mechanism or in combination therewith, the driving mechanism 160 may be provided with a Z feed screw and a Z actuator for moving the support member 168 in the Z-axis direction.

A group of circuits 105 for controlling the driving mechanism 160, imaging unit 170 and illumination unit 180 are provided inside the casing 101. A first communication device 192 is provided for the circuit group 105. The first communication device 192 is, for example, a device which communicates with the controller 200 by wireless. The communications are wireless communications using, for example, Wi-Fi or Bluetooth. The observation apparatus 100 and the controller 200 may be connected by a cable, and cable communications may be performed between them. As described above, the imaging unit 170 (which generates image data by photographing an object, with the transparent plate 102 interposed) and the driving mechanism 160 (which moves the imaging unit 170) are provided inside the casing 101. With this structure, the reliability is enhanced, easy handling and cleaning operation are ensured, and contamination can be prevented.

As shown in FIG. 2, the observation apparatus 100 comprises a first control circuit 110, a first storage circuit 130 and an image processing circuit 140, in addition to the driving mechanism 160, imaging unit 170, illumination unit 180 and first communication device 192 described above. The first control circuit 110, the first storage circuit 130, the image processing circuit 140 and the first communication device 192 are arranged, for example, in the circuit group 105 described above.

The first control circuit 110 controls each of the elements of the observation apparatus 100. The first control circuit 110 functions as a position control unit 111, an imaging control unit 112, an illumination control unit 113, a communication control unit 114, a recording control unit 115, a measurement control unit 116 and a coordinate operation unit 117. The position control unit 111 controls the driving mechanism 160 to control the position of the support member 168. The imaging control unit 112 controls the imaging unit 170 to cause the imaging unit to take an image of the sample 300 etc. The illumination control unit 113 controls the illumination unit 180. The communication control unit 114 controls the communications with the controller 200 performed using the first communication device 192. The recording control unit 115 controls the recording of data obtained by the observation apparatus 100. The measurement control unit 116 controls the overall measurement, including measurement times and the number of times the measurement is performed. The coordinate operation unit 117 performs calculation and obtains information on the coordinate position of the imaging unit 170 based on an image of the infrared light.

The first storage circuit 130 stores, for example, programs and various parameters used by the first control circuit 110. The first storage circuit 130 also stores data obtained by the observation apparatus 100.

The image processing circuit 140 performs various kinds of image processing for the image data obtained by the imaging unit 170. After the image processing by the image processing circuit 140, data are recorded in the first storage circuit 130 or transmitted to the controller 200 by way of the first communication device 192. The first control circuit 110 or the image processing circuit 140 may perform various kinds of analysis, based on the obtained image. For example, the first control circuit 110 or the image processing circuit 140 extracts an image of the cell or cell group included in the sample 300 or counts the number of cells or cell groups, based on the obtained image. The results of this analysis are recorded in the first storage circuit 130 or transmitted to the controller 200 by way of the first communication device 192.

In the present embodiment, the positions of the imaging unit 170 and illumination unit 180 moved by the driving mechanism 160 are specified by the coordinate operation unit 117, based on the images obtained by the imaging unit 170. Therefore, a pattern serving as a position mark is drawn on the transparent plate 102. The pattern is drawn using a wavelength-selective material that allows visible light to pass therethrough and reflects infrared light. The pattern therefore serves as an infrared light reflector.

Figure 3:
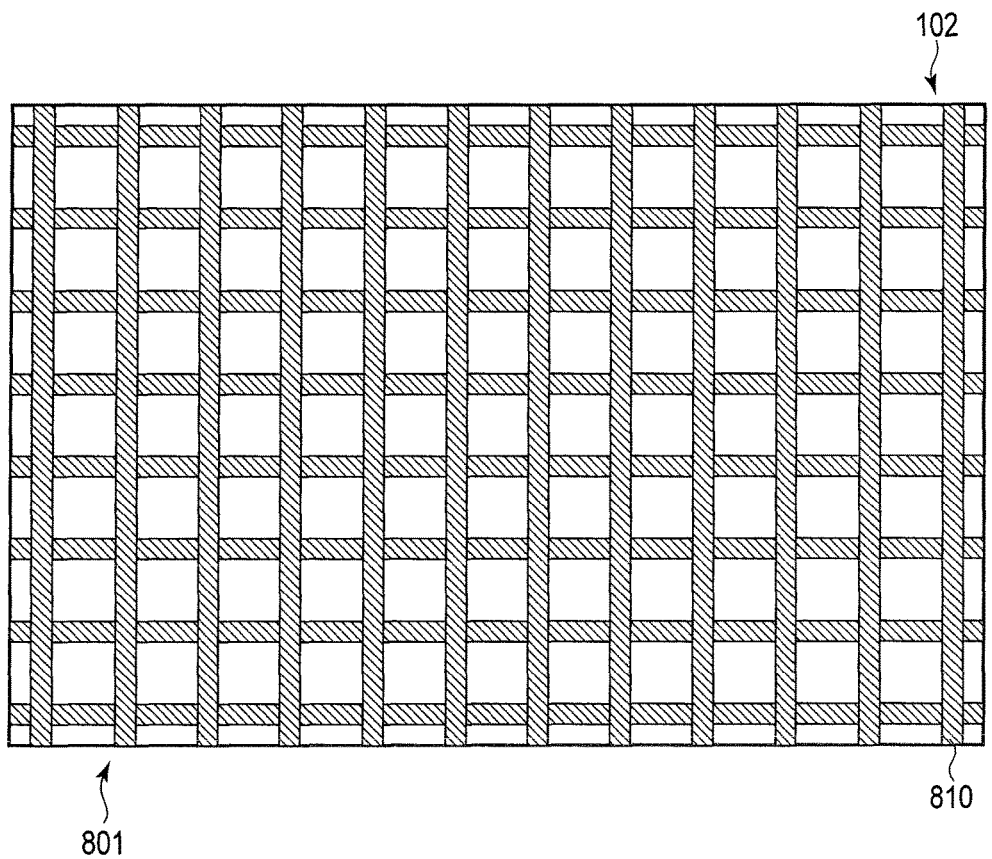
FIG. 3 is a schematic diagram illustrating an example of the reflection pattern of a transparent plate.

An example of this pattern is schematically shown in FIG. 3. As shown in FIG. 3, the elements of the infrared light reflector 810 are arranged in a lattice pattern, forming a reflection pattern 801. The thickness and number of elements of the infrared light reflector 810 can be properly adjusted.

Figure 4:
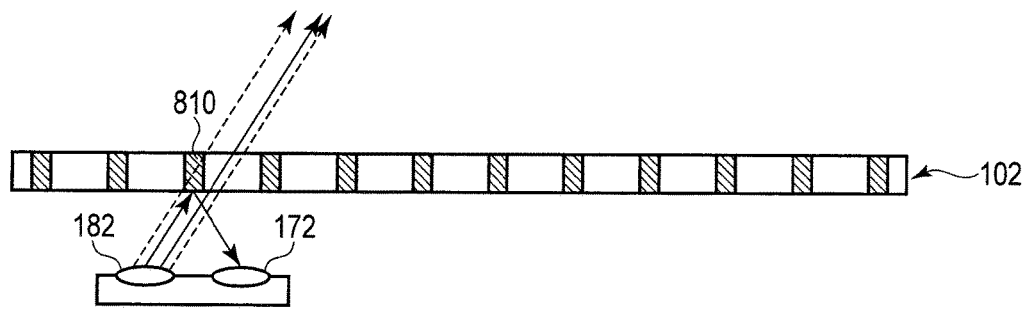
FIG. 4 is an explanatory diagram illustrating how optical paths of visible light and infrared light are with respect to the reflection pattern of the transparent plate.

FIG. 4 is a schematic diagram illustrating a side view of the transparent plate 102, imaging unit 170 and illumination unit 180. In FIG. 4, the regions where the infrared light reflector 810 is provided are indicated by hatching. The solid-line arrows indicate optical paths of infrared light, while the dashed-line arrows indicate optical paths of visible light. As shown in FIG. 4, the infrared light, included in the illumination light output from the illumination optical system of the illumination unit 180 and indicated by the solid lines, is reflected by the infrared light reflector 810 and passes through the other portions of the transparent plate 102. Part of the infrared light reflected by the infrared light reflector 810 is incident on the imaging optical system 172 of the imaging unit 170. The visible light, included in the illumination light and indicated by the dashed lines, passes through the transparent plate 102 not only at the portions where the infrared light reflector 810 is present but also at the other portions.

Figure 5:
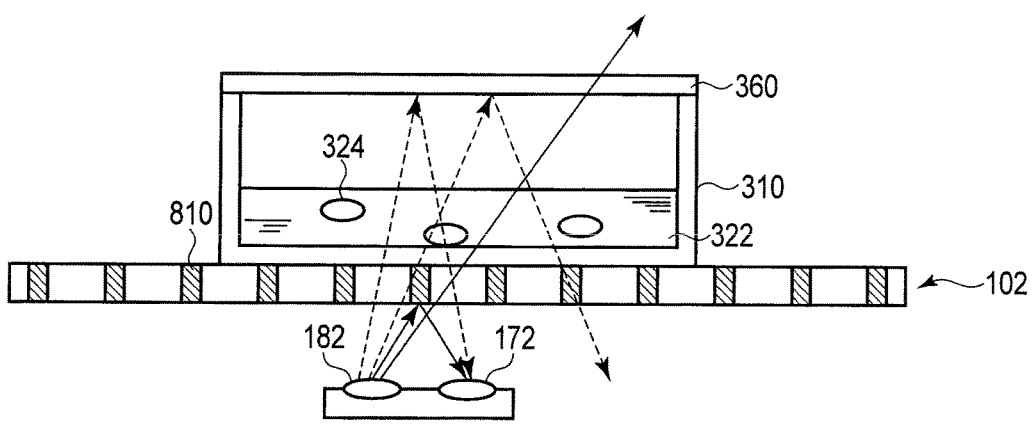
FIG. 5 is an explanatory diagram illustrating how optical paths of visible light and infrared light are with respect to the reflection pattern of the transparent plate and a sample.

FIG. 5 is a schematic diagram illustrating a side view of the transparent plate 102, sample 300, imaging unit 170 and illumination unit 180. As shown in FIG. 5, the reflecting plate 360 is arranged on top of the sample 300. The reflecting plate 360 reflects visible light. Desirably, the reflecting plate 360 absorbs infrared light or allows it to pass therethrough. FIG. 5 illustrates the case where the reflecting plate 360 allows infrared light to pass therethrough.

Of the illumination light output from the illumination optical system 182 of the illumination unit 180, the visible light indicated by the dashed lines passes through the transparent plate 102 at each portion without reference to whether the infrared light reflector 810 is present. The visible light having passed through the transparent plate 102 travels to the reflecting plate 360 provided on top of the vessel 310 and is reflected by the reflecting plate 360. Part of the reflected light illuminates the cells 324 and is incident on the imaging optical system 172 of the imaging unit 170.

The infrared light, included in the illumination light and indicated by the solid lines, is reflected at the infrared light reflector 810 and passes through the transparent plate 102 at the other portions. Part of the infrared light reflected by the infrared light reflector 810 is incident on the imaging optical system 172. The infrared light not reflected by the infrared light reflector 810 passes through the reflecting plate 360.

In the above manner, the imaging unit 170 images the infrared light reflected by the infrared light reflector 810, thereby taking an image of the lattice-like reflection pattern 801. The imaging unit 170 also images the visible light, by which a visible-light image of the sample 300 can be acquired without the undesired effects of the infrared light reflector 810.

(Controller)

The controller 200 is, for example, a personal computer (PC) or an information terminal such as a tablet type terminal. In FIG. 1, a tablet type information terminal is depicted.

The controller 200 is provided with an input/output device 270 including a display device 272 (e.g., a liquid crystal display) and an input device 274 (e.g., a touch panel). The input device 274 is not limited to the touch panel but may include a switch, a dial, a keyboard, a mouse, etc.

A second communication device 292 is provided for the controller 200. The second communication device 292 is a device which communicates with the first communication device 192. The observation apparatus 100 and the controller 200 communicate with each other through the first communication device 192 and the second communication device 292.

The controller 200 comprises a second control circuit 210 and a second storage circuit 230. The second control circuit 210 controls each of the elements of the controller 200. The second storage circuit 230 stores, for example, programs and various parameters used by the second control circuit 210. The second storage circuit 230 also stores data obtained by the observation apparatus 100 and received from the observation apparatus 100.

The second control circuit 210 functions as a system control unit 211, a display control unit 212, a recording control unit 213 and a communication control unit 214. The system control unit 211 performs various operations for controlling the measurement of the sample 300. The display control unit 212 controls the display device 272. The display control unit 212 causes the display device 272 to display the necessary information. The recording control unit 213 controls the operation of recording information in the second storage circuit 230. The communication control unit 214 controls the communications with the observation apparatus 100 which are performed using the second communication device 292.

Each of the first control circuit 110, image processing circuit 140 and second control circuit 210 incorporates an integrated circuit such as a central processing unit (CPU), an application specific integrated circuit (ASIC), a field programmable gate array (FPGA), or the like. Each of the first control circuit 110, image processing circuit 140 and second control circuit 210 may be constituted by a single integrated circuit or by a combination of a number of integrated circuits. The first control circuit 110 and the image processing circuit 140 may be made by a single integrated circuit. Each of the position control unit 111, imaging control unit 112, illumination control unit 113, communication control unit 114, recording control unit 115, measurement control unit 116 and coordinate operation unit 117 of the first control circuit 110 may be constituted by a single integrated circuit or by a combination of a number of integrated circuits. Two or more of the position control unit 111, imaging control unit 112, illumination control unit 113, communication control unit 114, recording control unit 115, measurement control unit 116 and coordinate operation unit 117 may be constituted by a single integrated circuit or the like. Likewise, each of the system control unit 211, display control unit 212, recording control unit 213 and communication control unit 214 of the second control circuit 210 may be constituted by a single integrated circuit or by a combination of a number of integrated circuits. Two or more of the system control unit 211, display control unit 212, recording control unit 213 and communication control unit 214 may be constituted by a single integrated circuit or the like. The operations of these integrated circuits are executed, for example, in accordance with programs stored in the first storage circuit 130 or second storage circuit 230, or in accordance with the programs stored in the storage regions of the integrated circuits.

(Operations of Measurement System)

Figure 6:
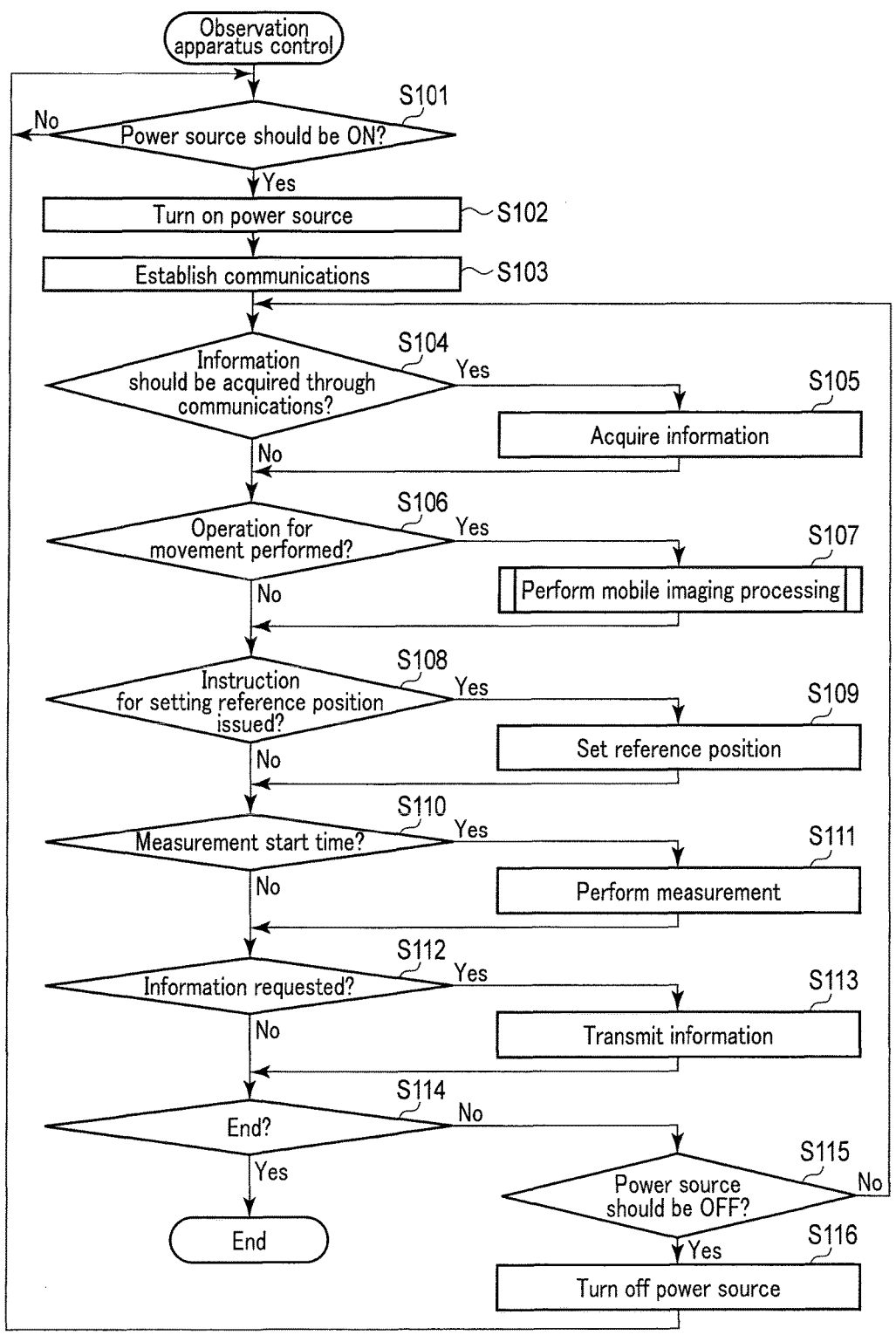
FIG. 6 is a flowchart illustrating an example of observation apparatus control processing according to the first embodiment.

Operations of the measurement system 1 will be described. A description will be given as to how a reference position for measurement is determined based on an image of the reflection pattern 801 of the infrared light reflector 810 of the transparent plate 102. The operation of the observation apparatus 100 will be described with reference to the flowchart shown in FIG. 6. The flowchart shown in FIG. 6 starts when the observation apparatus 100, controller 200 and sample 300 are in place and preparations for measurement have been made.

In step S101, the first control circuit 110 determines whether or not the power source should be turned on. For example, where the power source is configured to be turned on at predetermined times and when the time to turn on the power switch comes, the first control circuit 110 determines that the power source should be turned on. Where the observation apparatus 100 constantly communicates with the controller 200 through low-power-consumption communication means such as Bluetooth Low Energy, and when the observation apparatus 100 receives an instruction to turn on the power source from the controller 200 through the communication means, the first control circuit 110 determines that the power source should be turned on. Unless the power source is turned on, the processing stands by, repeating steps S101. If it is determined that the power source should be turned on, the processing advances to step S102.

In step S102, the first control circuit 110 turns on the power source to supply power to the respective portions of the observation apparatus 100. If the power source is turned on only when the sample 300 is measured in practice, power saving can be attained. In particular, if the power source of the observation apparatus 100 is a battery, the driving time of the observation apparatus 100 can be lengthened.

In step S103, the first control circuit 110 establishes communications with the controller 200. The communication means used in the embodiment is high-speed communication means, such as Wi-Fi.

In step S104, the first control circuit 110 determines whether or not information should be acquired from the controller 200 through the established communications. For example, when information is transmitted from the controller 200, it is determined that the information should be acquired. Unless the information should be acquired, the processing advances to step S106. If the information should be acquired, the processing advances to step S105.

In step S105, the first control circuit 110 acquires the information transmitted from the controller 200. The acquired information may include condition information transmitted from the controller 200 to the observation apparatus, such as measurement conditions (including imaging conditions, imaging intervals and other parameters), a method for recording measurements, and a transmission condition for the measurements. Subsequently, the processing advances to step S106.

In step S106, the first control circuit 110 determines whether an operation for moving the imaging unit 170 in the X-axis direction or in the Y-axis direction by use of the controller 200 is performed or not. If it is determined that the operation for movement is not performed, the processing advances to step S108. If it is determined that the operation for movement is performed, the processing advances to step S107.

In step S107, the first control circuit 110 causes the imaging unit 170 to perform mobile imaging processing in which the imaging unit 170 takes images while moving. In the mobile imaging processing, the visible light of the illumination light is set at such a feeble level as enables imaging. This is for suppressing the damage which the light may give to the cells 324 of the sample 300. The illumination control unit 113 of the first control circuit 110 sets the intensity of the visible light emitted from the illumination unit 180 at a feeble level. On the other hand, the imaging control unit 112 of the first control circuit 110 controls the imaging unit 170 such that an image can be acquired even when the illumination light is feeble. For example, the imaging control unit 112 fully opens the diaphragm of the imaging optical system 172 or enhances the sensitivity of the image sensor 174. An image acquired with the visible light is processed by the image processing circuit 140 and is then transmitted to the controller 200. The controller 200 causes the display device 272 to display the image the second control circuit 210 receives from the observation apparatus 100.

In the mobile imaging, imaging is performed using infrared light as position calculation light, and an image of the reflection pattern 801 is acquired as a position calculation image. To be specific, the illumination control unit 113 controls the illumination unit 180 to emit infrared light. The imaging control unit 112 causes the imaging unit 170 to perform imaging using the infrared light. The coordinate operation unit 117 of the first control circuit 110, which has acquired the image of the reflection pattern 801, calculates the current position of the imaging unit 170 on the basis of the image of the reflection pattern 801 acquired in the mobile imaging, namely, the position calculation image. Based on the calculated position of the imaging unit 170, the position control unit 111 of the first control circuit 110 controls the position of the imaging unit 170.

This pattern is not limited to a pattern having wavelength characteristics but may be a pattern utilizing a polarization property difference. Different image information can be obtained not only by differences in wavelengths and polarization property but also by differences in images taken under different conditions. For example, the pattern can be modified as being translucent or being made of thin lines. This can be accomplished by applying the technology of a general camera, which can take an image of a faraway object beyond a wire fence by properly adjusting the focus and exposure. For example, if images are taken, with the imaging unit being changed in position, since images of a faraway object do not much vary due to the principles of triangulation or parallax, only the images required can be selected. Systems realizing these are encompassed by the technical idea of the present invention. That is, a new technical idea can be developed by applying the phenomenon that different images are taken not only by changing the illumination but also by changing the imaging (photographing) position, the focus position and the exposure. In other words, information different from an image of a target object is not limited to information obtained by changing imaging conditions but may be information obtained by properly processing obtained images or information obtained by performing calculation for the obtained images.

In the present embodiment, images based on visible light and images based on infrared light have to be separated from each other. Several methods are available for separating images based on visible light and images based on infrared light. In the present embodiment, any separation method can be used, including the method mentioned below.

For example, the imaging unit 170 may include independent image sensors, one for imaging visible light and the other for imaging infrared light. In this case, the illumination unit 180 simultaneously emits both visible light and infrared light, and the imaging unit 170 simultaneously acquires both an image based on the visible light and an image based on the infrared light.

The imaging unit 170 may include a single image sensor, and the imaging unit 170 may have switchable spectroscopic functions, such as those provided by a spectral filter. In this case, the illumination unit 180 simultaneously emits both visible light and infrared light, and the imaging unit 170 acquires an image based on the visible light and an image based on the infrared light in a time divisional manner by switching spectroscopic characteristics in a time divisional manner. In synchronism with the switching of the spectroscopic characteristics of the imaging unit 170, whether or not to emit the visible light and the infrared light from the illumination unit 180 may be controlled.

The imaging unit may include a single image sensor capable of imaging both visible light and infrared light, and the illumination unit 180 may emit the visible light and the infrared light in a time divisional manner. In this case, the image which is obtained by the imaging unit 170 when the visible light is being emitted from the illumination unit 180 is an image based on the visible light, and the image which is obtained by the imaging unit 170 when the infrared light is being emitted from the illumination unit 180 is an image based on the infrared light.

The image based on the visible light and the image based on the infrared light are not restrictive but may be images of different wavelengths. The images may be replaced with images based on differences in the polarization property. Since different image information can be obtained by taking images under different conditions other than the wavelengths, systems utilizing this are encompassed by the technical idea of the present invention. Such systems are based on the technical idea that different images are taken not only by changing the illumination but also by changing the imaging (photographing) position, the focus position and the exposure.

In the mobile imaging processing performed in step S107, the coordinate operation unit 117 of the first control circuit 110 performs calculation and obtains information on the position of the imaging unit 170 based on the image of the infrared light, i.e., the position calculation light. By way of example, let us assume that mobile imaging is started after the driving mechanism 160 moves the imaging unit 170 to the initial position. Based on the image of the infrared light, the coordinate operation unit 117 counts the numbers of those lines of the reflection pattern 801 which the imaging unit 170 crosses in the X-axis direction and Y-axis direction, and specifies the current position of the imaging unit 170 based on the numbers. To be more specific, the current X coordinate can be acquired by counting the number of those lines of the reflection pattern 801 which are detected as having been crossed when the imaging unit 170 moves in the X-coordinate increasing direction and counting the number of those lines of the reflection pattern 801 which are detected as having been crossed when the imaging unit 170 moves in the X-coordinate decreasing direction. Likewise, the current Y coordinate can be acquired by counting the number of those lines of the reflection pattern 801 which are detected as having been crossed when the imaging unit 170 moves in the Y-coordinate increasing direction and counting the number of those lines of the reflection pattern 801 which are detected as having been crossed when the imaging unit 170 moves in the Y-coordinate decreasing direction.

After the mobile imaging processing in step S107, the processing advances to step S108. In step S108, the first control circuit 110 determines whether or not an instruction for setting a reference position is issued from the controller 200. The reference position is determined, for example, as follows. The user moves the imaging unit 170 while looking at the visible light image obtained in the mobile imaging and displayed on the display device 272 of the controller 200. When the imaging unit 170 is at a desired position, the user operates the controller 200 to enter an instruction for setting the position as a reference position. A determination is made in step S108 as to whether or not an instruction for setting such a reference position is entered. Unless an instruction for setting a reference position is entered, the processing advances to step S110. If an instruction for setting a reference position is entered, the processing advances to step S109.

In step S109, the first control circuit 110 determines that the current position of the imaging unit 170 (which the coordinate operation unit 117 determines based on the reflection pattern 801) as a reference position. Subsequently, the processing advances to step S110.

In step S110, the first control circuit 110 determines whether or not the current time is a time when the measurement should be started. Unless the current time is a measurement start time, the processing advances to step S112. If the current time is a measurement start time, the processing advances to step S111. The measurement start time may be predetermined, for example, at the intervals of one hour. The measurement start time need not be dependent on time; it may be determined in accordance with the state of cells 324 or culture medium 322. In the present embodiment, measurement is repeatedly performed whenever the measurement start time comes. Alternatively, measurement may be started in response to a measurement start instruction entered by the user.

In step S111, the first control circuit 110 performs measurement processing. In other words, the first control circuit 110 causes the imaging unit 170 to repeatedly take an image, while simultaneously causing the driving mechanism 160 to move the imaging unit 170. The reference position from which the imaging unit 170 is moved is the reference position determined in step S109. The first control circuit 110 performs predetermined processing for an image taken by the imaging unit 170 and records a requested result in the first storage circuit 130. Subsequently, the processing advances to step S112.

Figure 7:
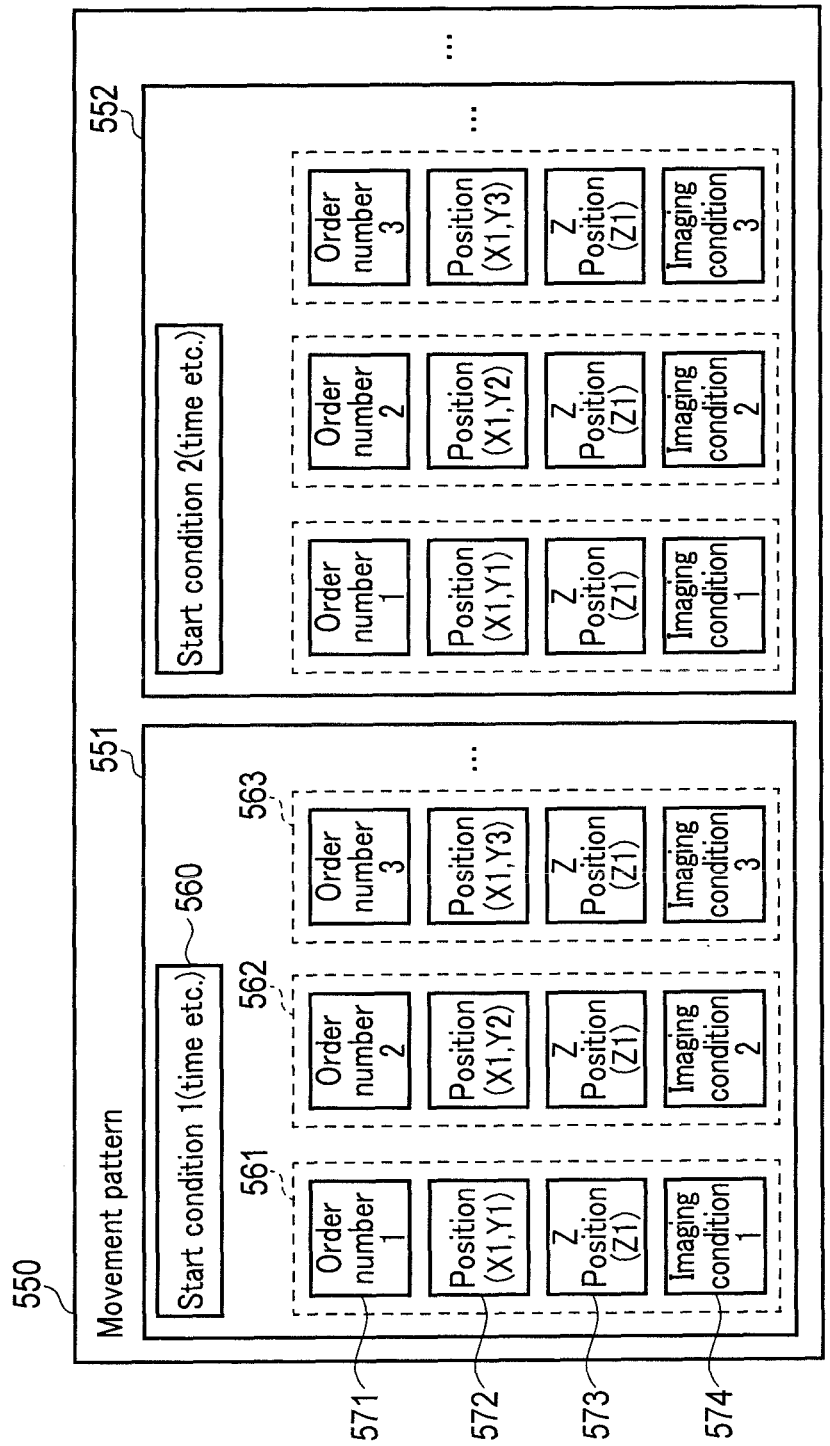
FIG. 7 is an explanatory diagram illustrating information on a movement pattern of the observation apparatus of the first embodiment.

The movement pattern according to which the driving mechanism 160 moves the imaging unit 170 in the measurement processing will be described with reference to FIG. 7. FIG. 7 shows an example of the movement pattern 550. The movement pattern 550 such as that shown in FIG. 7 is recorded in the first storage circuit 130. The range in which an image is taken by the measurement processing specified by the movement pattern 550 can be defined using the reference position mentioned above.

The first control circuit 110 controls the driving mechanism 160 and the imaging unit 170 in accordance with the movement pattern 550. In other words, the movement pattern 550 includes operation procedures of the driving mechanism 160 and the imaging unit 170. As shown in FIG. 7, the movement pattern 550 includes a first movement pattern 551 indicative of a first-time measurement, a second movement pattern 552 indicative of a second-time measurement, etc. The first movement pattern 551 and the second movement pattern 552 may be the same or different. The number of data of movement patterns increases or decreases in accordance with the number of times measurement is performed. If measurement is performed using the same movement pattern, only one movement pattern may be prepared.

The first movement pattern 551 will be described by way of example. The first movement pattern 551 includes a start condition 560. This start condition 560 includes a condition under which the measurement start is determined in step S110.

In the first movement pattern 551, first imaging information 561, second imaging information 562, third imaging information 563, etc. are recorded. The first imaging information 561 will be described by way of example. The first imaging information 561 includes an order 571, a position 572, a Z position 573 and an imaging condition 574. The order 571 is indicated by serial numbers which are assigned to the image operations performed for respective positions. The position 572 includes an X coordinate and a Y coordinate of an imaging position. The X coordinate and the Y coordinate are values used by the position control unit 111 for the control of the driving mechanism 160. The Z position 573 includes a Z coordinate of an imaging position. The Z coordinate is a value used by the imaging control unit 112 for the control of the imaging optical system 172. The imaging condition 574 includes exposure conditions, such as a shutter speed and an aperture value, and other imaging conditions. The imaging conditions may differ, depending upon each imaging operation, they may be the same for the imaging operations included in the first movement pattern 551, or they may be the same for all imaging operations included in the movement pattern 550. Likewise, each of the second imaging information 562 and the third imaging information 563 includes information regarding an order, a position, a Z position and an imaging condition. Where an imaging plane is fixed and is not moved in the Z-axis direction, the information on the Z position 573 may be omitted. Where the imaging condition is fixed and is not changed, the information on the imaging condition 574 may be omitted.

The image acquisition performed in measurement processing will be described, referring to the schematic diagram shown in FIG. 8. The observation apparatus 100 repeatedly takes an image, while changing its position in the X direction and Y direction in the first plane, for example, and a plurality of images are acquired thereby. The image processing circuit 140 synthesizes these images, thereby preparing one first image 611 of the first plane. The first plane is a plane perpendicular to the optical axis of the imaging unit 170, i.e., a plane parallel to the transparent plate 102. Further, the observation apparatus 100 changes the imaging position in the thickness direction to a second plane and to a third plane by changing the focus position of the imaging unit 170, and repeatedly takes an image, while changing its position in the X direction and Y direction in each of the planes. A second image 612 and a third image 613 are acquired by the synthesizing the resultant images. It should be noted that the thickness direction is a Z-axis direction, namely the optical axis direction of the imaging unit 170, and is perpendicular to the transparent plate 102. In this manner, an image at each three-dimensional position is acquired. In the above, a description was given of an example in which an image is repeatedly taken, with the imaging plane being changed in the Z-axis direction. Instead of this, an image may be repeatedly taken, with the imaging plane being changed only in the X direction and Y direction (not in the Z-axis direction). In this case, a synthesis image of one plane is obtained. In the method for acquiring the first image 611, second image 612 and third image 613, a scan may be performed in the X direction and Y direction, with the position in the Z-axis direction being kept fixed, and after the position in the Z-axis direction is changed, a scan may be performed in the X direction and Y direction. Alternatively, an image of a given position in the X direction and Y direction may be taken a number of times, with the position being changed in the Z-axis direction, and this operation may be performed, with the scan position being changed in the X direction and Y direction.

In the imaging operation for measurement, the sample 300 need not be kept irradiated with the illumination light. The sample 300 may be irradiated only at the moment of time when the imaging is performed. Since the irradiation time can be short, damage to the cells 324 can be suppressed. For this reason, visible light having sufficient intensity as illumination light can be radiated to the sample 300 in synchronism with the time when the imaging is performed. This contributes to creation of images of good quality.

Figure 9:
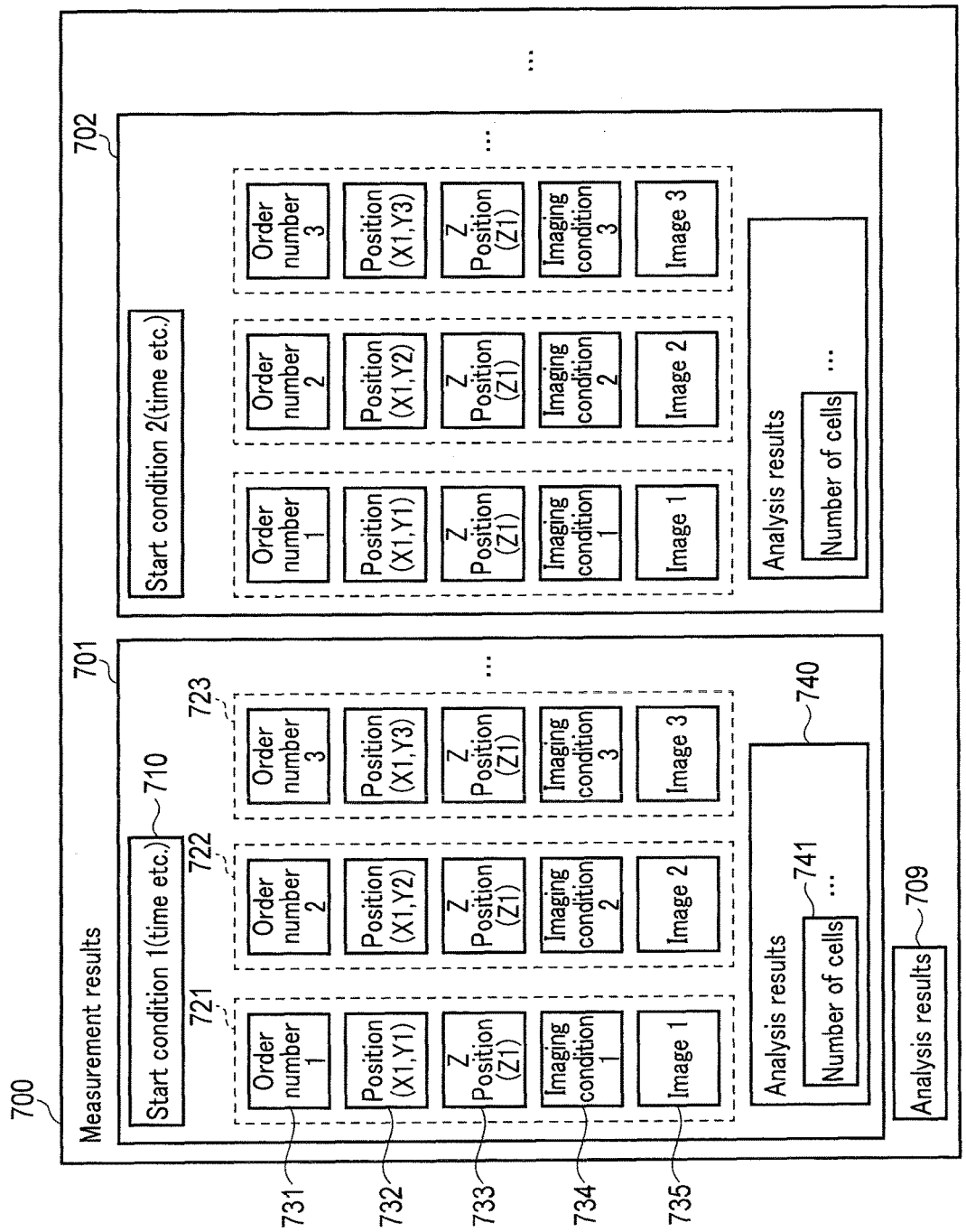
FIG. 9 schematically illustrates an exemplary configuration of data representing measurement results obtained by the measurement system of the first embodiment.

An example of a data structure of measurement results obtained as above and recorded in the first storage circuit 130 is shown in FIG. 9. As shown in FIG. 9, the measurement results 700 include first data 701 obtained by first-time measurement, second data 702 obtained by second-time measurement, etc. The number of data increases or decreases in accordance with the number of times measurement is performed.

The first data 701 will be described by way of example. The first data 701 includes a start condition 710. This start condition 710 includes a condition under which the measurement start is determined in step S110. For example, a measurement start time is predetermined, and when measurement is started at this measurement start time, the measurement start time is recorded as a start condition 710.

In the first data 701, first image information 721, second image information 722, third image information 723, etc. are recorded. Each of these data is a set of data acquired in one-time imaging. The first image information 721 will be described by way of example. The first image information 721 includes an order 731, a position 732, a Z position 733, an imaging condition 734, and an image 735. The order 731 is indicated by serial numbers which are assigned to the image operations performed for respective positions. The position 732 includes an X coordinate and a Y coordinate of an imaging position. The X coordinate and the Y coordinate are values used in the control of the driving mechanism 160 and are acquired by the position control unit 111, for example. The Z position 733 includes a Z coordinate of an imaging position. The Z coordinate is a value used in the control of the imaging optical system 172 and is acquired by the imaging control unit 112, for example. The imaging condition 734 includes exposure conditions, such as a shutter speed and an aperture value, and other imaging conditions. The imaging conditions may differ, depending upon each imaging operation, they may be the same for the imaging operations included in the first data 701, or they may be the same for all imaging operations included in the measurement results 700. The image 735 is image data obtained by the imaging. Likewise, each of the second image information 722 and the third image information 723 includes information regarding an order, a position, a Z position, an imaging condition and an image. Where an imaging plane is not moved in the Z-axis direction, the information on the Z position may be omitted.

The first data 701 includes analysis results 740. The analysis results 740 include a cell number 741 representing the number of cells or cell groups measured by the image processing circuit 140. The analysis results 740 also include a plane image obtained by synthesizing the images of the same Z position. The analysis results 740 also include a three-dimensional image obtained by synthesizing all images 735. The analysis results 740 may include a depth-synthesis image.

Like the first data 701, the second data 702 includes a start condition, first image data, second image data, third image data, analysis results, etc.

The measurement results 700 can include analysis results 709 of the overall measurement that are obtained based on the first data, second data, etc. All measurement results 700 may be recorded in one file; alternatively, part of the measurement results 700 may be recorded in one file.

Turning back to FIG. 6, a description will be continued. In step S112, the first control circuit 110 determines whether or not a request for information is made by the controller 200. For example, the data obtained in step S111 is requested by the controller 200. Unless the request for information is made, the processing advances to step S114. If the request for information is made, the processing advances to step S113.

In step S113, the first control circuit 110 transmits the information requested by the controller 200 to the controller 200 through the first communication device 192. The transmitted information can include images acquired by the observation apparatus 100, imaging conditions under which the images are acquired, results of the analysis performed for the acquired images, etc., which are transmitted from the observation apparatus 100 to the controller 200. Subsequently, the processing advances to step S114.

In step S114, the first control circuit 110 determines whether or not the observation apparatus control processing should be ended. If it is determined that the observation apparatus control processing should be ended, the observation apparatus control processing is brought to an end. For example, when a series of measurements are ended, and the observation apparatus 100 is removed from the incubator, the observation apparatus control processing is brought to an end. Unless the observation apparatus control processing is brought to an end, the processing advances to step S115.

In step S115, the first control circuit 110 determines whether or not the power source should be turned off. For example, if the standby time, which is from the measurement in step S111 to the next measurement, is long, the first control circuit 110 determines that the power source should be turned off for supplying the energy to the unnecessary part to suppress the power consumption. Unless the power source is turned off, the processing returns to step S104. If it is determined that the power source should be turned off, the processing advances to step S116.

In step S116, the first control circuit 110 turns off each unnecessary part of the observation apparatus 100 during the standby time. Subsequently, the processing returns to step S101. In the above manner, the observation apparatus 100 repeatedly performs measurement.

Figure 10:
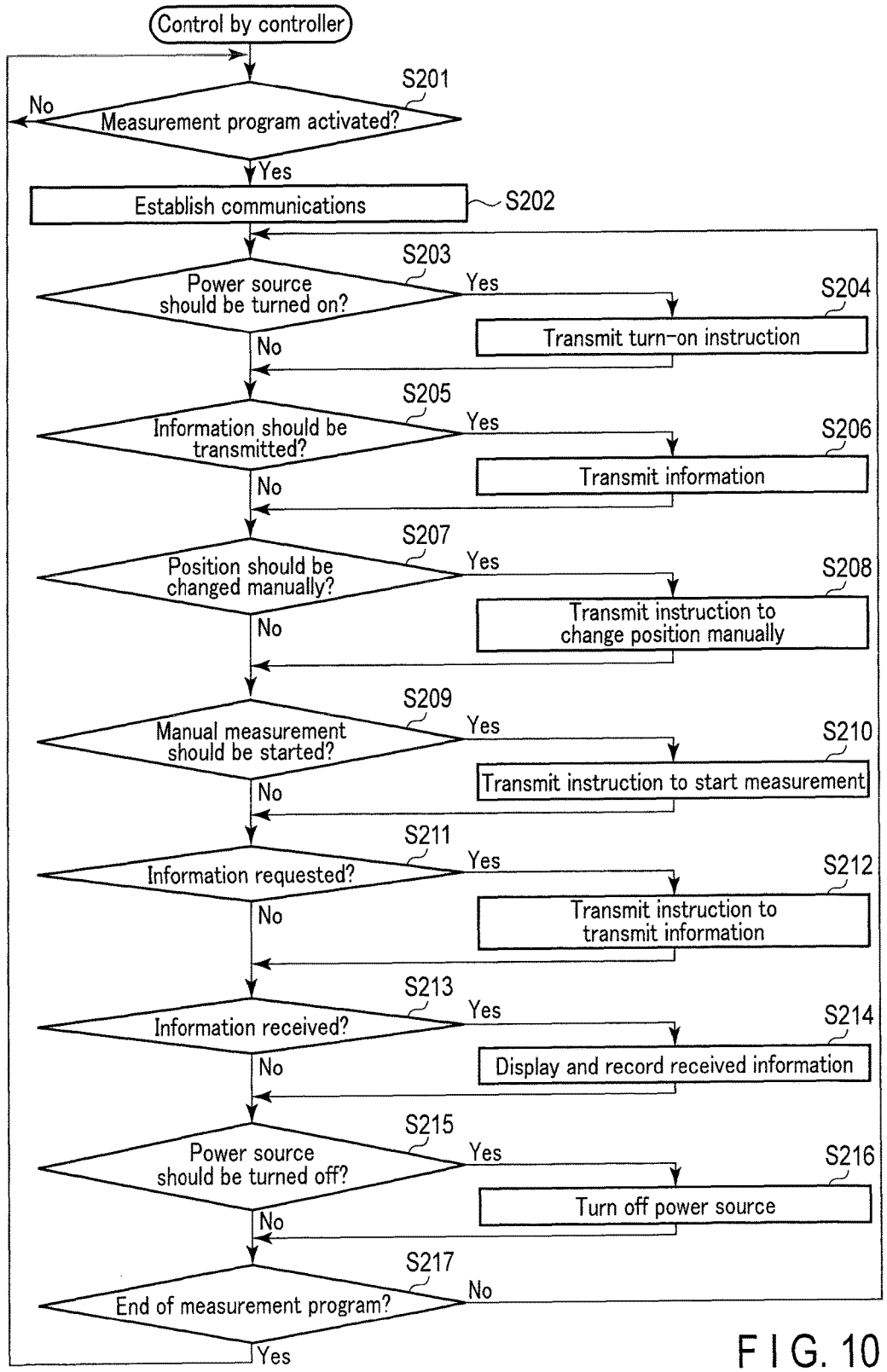
FIG. 10 is a flowchart illustrating an example of controller control processing according to the first embodiment.

Next, the operation of the controller 200 will be described with reference to the flowchart shown in FIG. 10. The processing shown in the flowchart of FIG. 10 starts when the observation apparatus 100, controller 200 and sample 300 are set in place.

In step S201, the second control circuit 210 determines whether or not a measurement program according to the present embodiment is activated. Unless the measurement program is activated, the processing of step S201 is repeated. The controller 200 is not limited to the functions of the controller of the measurement system of the present embodiment but may have various functions. Therefore, when the measurement program is not activated, the controller 200 may operate as a system other than the measurement system 1. If it is determined that the measurement program is activated, the processing advances to step S202.

In step S202, the second control circuit 210 establishes communications with the observation apparatus 100. This operation is related to step S103 of the observation apparatus control performed by the observation apparatus 100. That is, the observation apparatus 100 and the controller 200 operate such that the communications between them are established. The communications established then may be low-power-consumption communications being irrelevant to step S103 of the observation apparatus control and only enabling the transmission of an instruction to turn on the observation apparatus 100.

In step S203, the second control circuit 210 determines whether or not the user is requesting that the observation apparatus 100 be turned on. For example, if an instruction to turn on the observation apparatus 100 is supplied from the input device 274, the second control circuit 210 determines that the user is requesting that the power source be turned on. Unless the instruction to turn on the observation apparatus 100 is supplied, the processing advances to step S205. If the instruction to turn on the observation apparatus 100 is supplied, the processing advances to step S204. In step S204, the second control circuit 210 transmits an instruction to turn on the observation apparatus 100 to the observation apparatus 100. Subsequently, the processing advances to step S205. This operation is related to step S101 of the observation apparatus control performed by the observation apparatus 100. Upon receipt of the instruction to turn on the observation apparatus 100 from the controller 200, the observation apparatus 100 is turned on in step S102. The communication means used in the embodiment may be low-power-consumption communications such as Bluetooth Low Energy.

In step S205, the second control circuit 210 determines whether or not the user is requesting transmission of information to the observation apparatus 100. For example, if an instruction to transmit information is supplied from the input device 274, the second control circuit 210 determines that the user is requesting transmission of information. The information the transmission of which is requested is information on measurement conditions etc. Unless the transmission of information is requested, the processing advances to step S207. If the transmission of information is requested, the processing advances to step S206. In step S206, the second control circuit 210 transmits the information entered from the input device 274 to the observation apparatus 100. Subsequently, the processing advances to step S207. This operation is related to step S104 of the observation apparatus control performed by the observation apparatus 100. The observation apparatus 100 acquires, in step S105, the information (such as measurement conditions) transmitted from the controller 200 to the observation apparatus 100.

In step S207, the second control circuit 210 determines whether or not the user is requesting that the position of the imaging unit 170 of the observation apparatus 100 be changed manually. For example, if an instruction to manually change the position of the imaging unit 170 is supplied from the input device 274, the second control circuit 210 determines that a manual position change is being requested. Unless the manual position change is requested, the processing advances to step S209. If the manual position change is requested, the processing advances to step S208. In step S208, the second control circuit 210 transmits an instruction to change the position of the imaging unit 170 to the observation apparatus 100. Subsequently, the processing advances to step S209. This operation is related to step S106 of the observation apparatus control performed by the observation apparatus 100. The observation apparatus 100 performs mobile imaging processing in step S107, based on the position change instruction transmitted from the controller 200 to the observation apparatus 100. At the time, the controller 200 acquires image data from the observation apparatus 100 and displays the acquired images on the display device 272.

In step S209, the second control circuit 210 determines whether or not the user is requesting that the observation apparatus 100 start measurement. For example, if an instruction to start measurement by the observation is supplied from the input device 274, the second control circuit 210 determines that the user is requesting start of measurement. If the start of measurement is not requested, the processing advances to step S211. If the start of measurement is requested, the processing advances to step S210. In step S210, the second control circuit 210 transmits an instruction to start measurement to the observation apparatus 100. Subsequently, the processing advances to step S209. This operation is related to step S110 of the observation apparatus control performed by the observation apparatus 100. Measurement is performed in step S111 in accordance with the instruction transmitted from the controller 200 to the observation apparatus 100.

In step S211, the second control circuit 210 determines whether or not the user is requesting acquiring information from the observation apparatus 100. For example, if an instruction to request information is supplied from the input device 274, the second control circuit 210 determines that the user is requesting information. The information requested then is, for example, information on the sample 300 obtained by the observation apparatus 100. The information can be information contained in the measurement results 700 described with reference to FIG. 9, and includes, for example, image data on the sample 300, the number of cells or cell groups included in the sample 300, etc. Unless the information is requested, the processing advances to step S213. If the information is requested, the processing advances to step S212. In step S212, the second control circuit 210 transmits an instruction to transmit the user's requested information to the observation apparatus 100. Subsequently, the processing advances to step S213. This operation is related to step S112 of the observation apparatus control performed by the observation apparatus 100. The information requested in step S113 (e.g., images obtained by the observation apparatus 100 and analysis results thereof) is transmitted from the observation apparatus 100 to the controller 200 in accordance with the information request transmitted from the controller 200 to the observation apparatus 100.

In step S213, the second control circuit 210 determines whether or not the information requested in step S212 is received. Unless the information is received, the processing advances to step S215. If the information is received, the processing advances to step S214. In step S214, the second control circuit 210 displays the received information on the display device 272 or records it in the second storage circuit 230. Subsequently, the processing advances to step S215.

In step S215, the second control circuit 210 determines whether or not the user is requesting that the observation apparatus 100 be turned off. For example, if an instruction to turn off the observation apparatus 100 is supplied from the input device 274, the second control circuit 210 determines that the user is requesting that the power source be turned off. Unless the instruction to turn off the observation apparatus 100 is supplied, the processing advances to step S217. If the instruction to turn off the observation apparatus 100 is supplied, the processing advances to step S216. In step S216, the second control circuit 210 transmits an instruction to turn off the observation apparatus 100 to the observation apparatus 100. Subsequently, the processing advances to step S217. This operation is related to step S115 of the observation apparatus control performed by the observation apparatus 100. The observation apparatus 100 is turned off in step S116 in accordance with the turn-off instruction transmitted from the controller 200 to the observation apparatus 100.

In step S217, the second control circuit 210 determines whether or not the measurement program comes to an end. If the measurement program ends, the processing returns to step S201. Unless the measurement program ends, the processing returns to step S203. As can be seen from this, the above operation is repeatedly executed.

As described above, the measurement by the measurement system 1 is repeatedly performed at predetermined timings and under predetermined conditions. Measurement timings and measurement conditions may be entered by the user from the controller 200 and set in the observation apparatus 100. The measurement by the measurement system 1 may be manually performed based on the user's instruction when the user's instruction is entered from the controller 200 and supplied to the observation apparatus 100.

<Advantage of the Measurement System>

The measurement system 1 of the present embodiment can take an image of cells in a wide range in the state where the sample 300 is statically placed in the incubator. It should be noted that an image can be repeatedly taken with time. The user can therefore observe how the cells change with time and analyze the change. According to the present embodiment, the reflection pattern 801 drawn on the transparent plate 102 is imaged, and the position of the imaging unit 170 is determined based on the resultant image. In other words, information is present at a position which is close to a target object in the X, Y or Z-axis direction, or substantially in the neighborhood of the position, so that auxiliary information can be used readily. Even if the pattern overlaps the target object or is imaged together with the target object, what is required is merely to take an image of the target object under a different condition. By so doing, the target object can be observed with no adverse effects of the intervening pattern, and only the pattern can be detected with accuracy. It should be noted here that the imaging unit 170 is a unit required for the measurement of the sample 300. According to the present embodiment, a special apparatus for acquiring the position of the imaging unit 170 is not required; for example, an encoder does not have to be provided for the driving mechanism 160. The light for measurement and the light for position detection are used in distinction from each other, and a wavelength-selective reflecting material is used as the material of the reflection pattern 801. Owing to this, the measurement of the sample 300 is not affected. The pattern can be designed to have no adverse effects on the measurement of the sample by properly determining the position of the pattern, the thickness of the lines of the pattern, the transmission factor of the pattern, etc., in addition to making the pattern wavelength-selective. In other words, even if the pattern is not made of a wavelength-selective reflecting material, and light having an identical wavelength is used, an observation image and a position calculation image can be obtained in distinction from each other by adjusting the imaging conditions other than the wavelength.

<Reflection Pattern>

Figure 11:
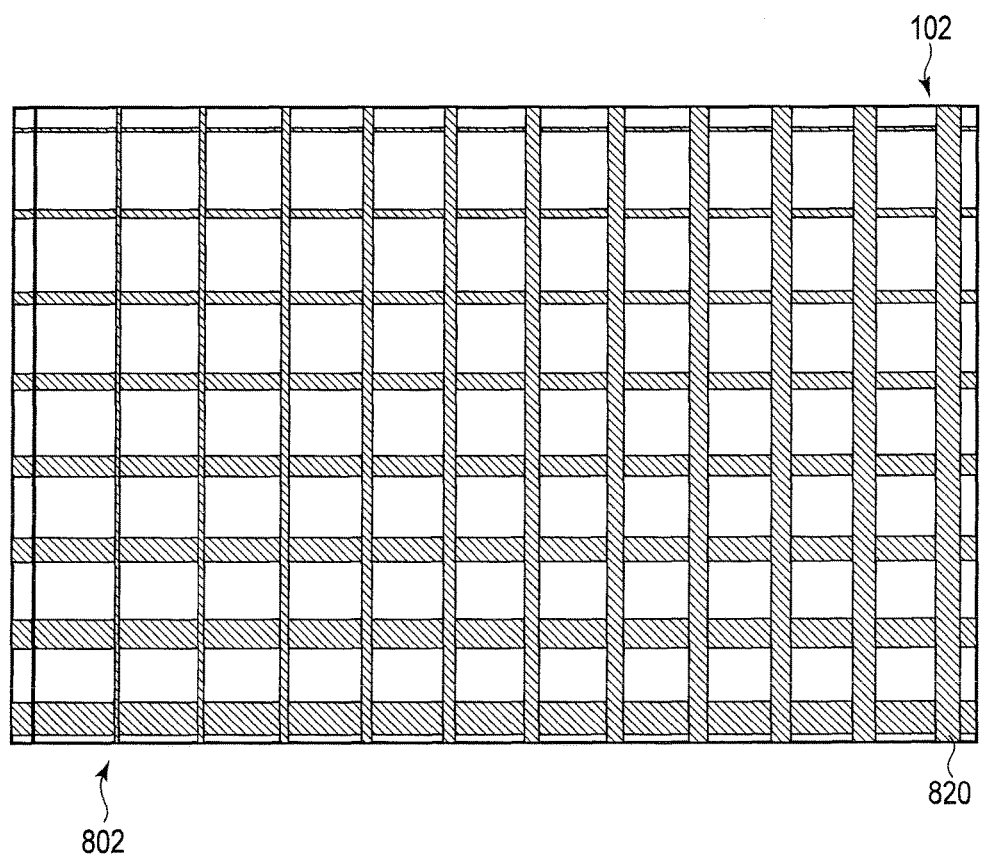
FIG. 11 is a schematic diagram illustrating another example of the reflection pattern of the transparent plate.

Another example of the reflection pattern, which is drawn on the transparent plate 102 using a wavelength-selective reflecting material, will be described with reference to the drawings. As shown, for example, in FIG. 11, the infrared light reflector 820 of the reflection pattern 802 may be made of lines of different thicknesses, depending upon the positions. If the lines of the infrared light reflector 820 differ in thickness depending upon their positions, the coordinate operation unit 117 can analyze the thickness of the infrared light reflector 820 based on an image of the reflection pattern 802, so as to determine the position of the imaging unit 170. As described above, the reflection pattern 802 has different characteristics determined by the thicknesses of the lines of the infrared light reflector 820, and the coordinate operation unit 117 can calculate coordinates by analyzing the characteristics.

Figure 12:
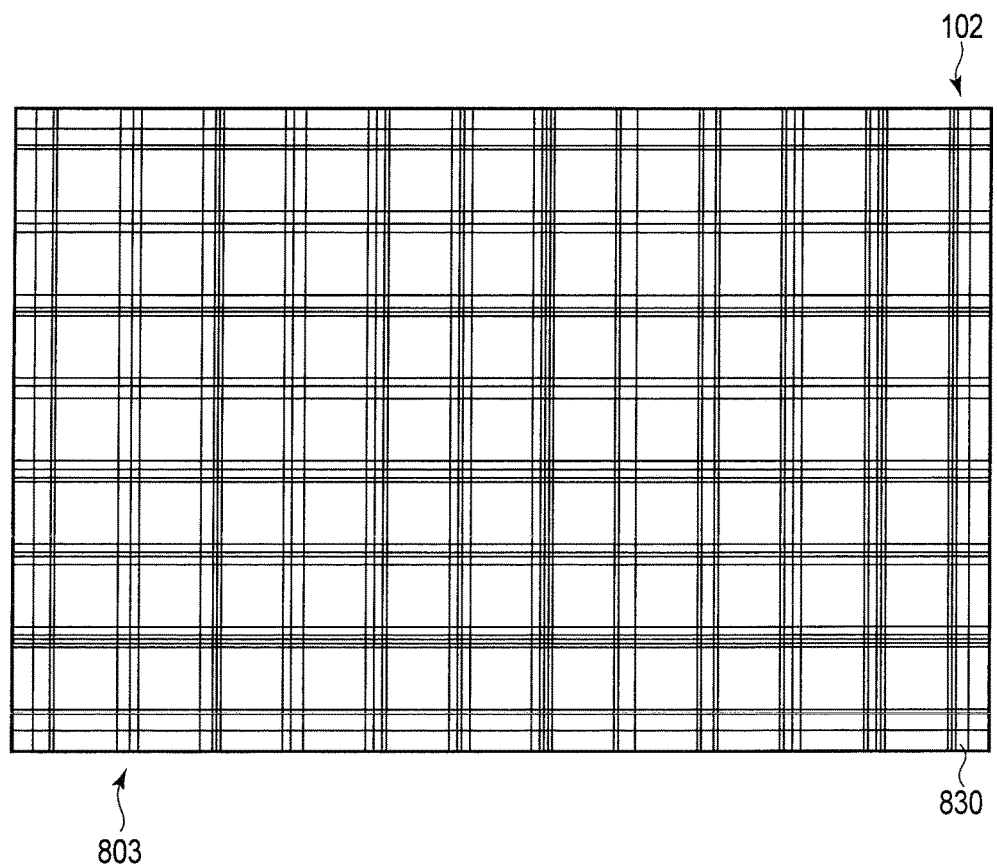
FIG. 12 is a schematic diagram illustrating still another example of the reflection pattern of the transparent plate.

As shown, for example, in FIG. 12, the reflection pattern 803 may have different characteristics determined by the design of the infrared light reflector 830. For example, the intervals of the lines and the thicknesses of the lines are different, depending upon the positions. If the infrared light reflector 820 have different characteristics depending upon the positions, the coordinate operation unit 117 can determine the position of the imaging unit 170 based on an image of the reflection pattern 803.

Figure 13:
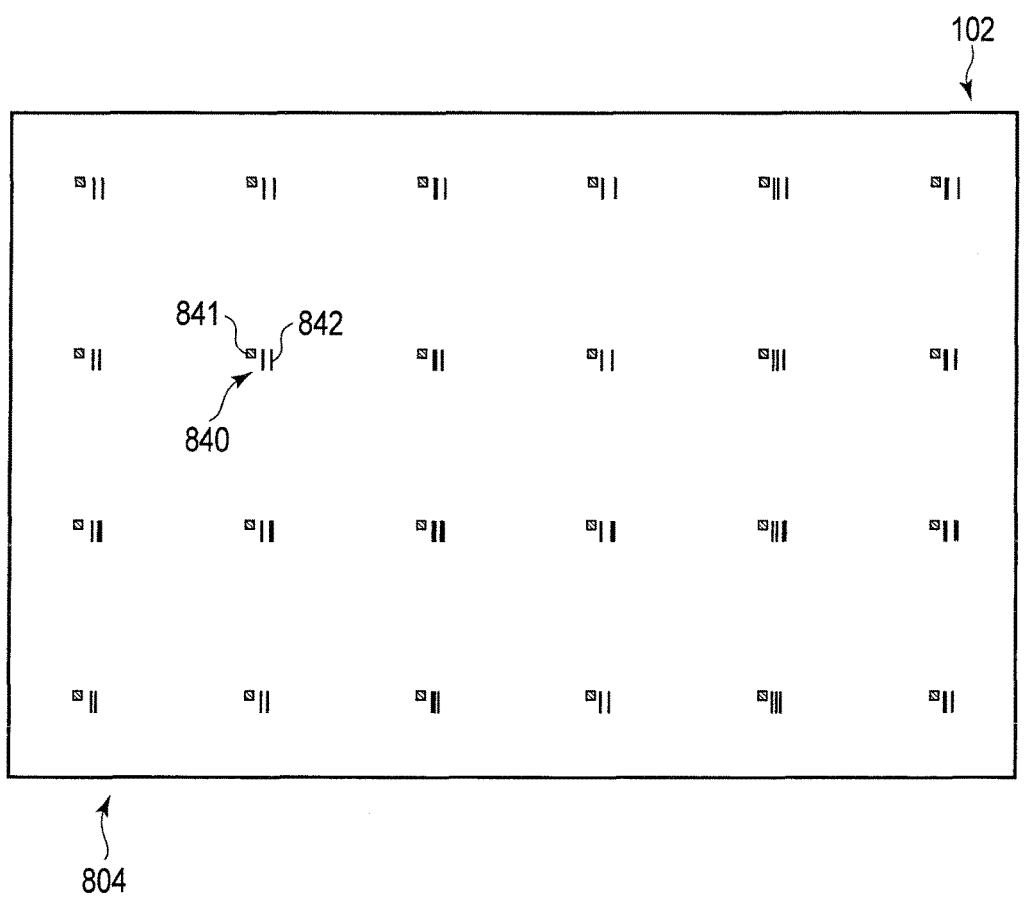
FIG. 13 is a schematic diagram illustrating a further example of the reflection pattern of the transparent plate.

As shown, for example, in FIG. 13, the reflection pattern 804 may be made of discretely-arranged infrared light reflectors 840, in place of the lines extending from one side to another on the transparent plate 102. In the example shown in FIG. 13, a plurality of dots 841 are uniformly arranged on the transparent plate 102, and bar codes 842, a kind of design, are arranged in the neighborhood of the respective dots 841. The bar codes 842 represent information on the respective dots 841. In place of the bar codes 842 described above, two-dimensional codes representing information on the respective dots 841 may be arranged.

Although the coordinates have been described among others, the reflection pattern may include any kind of information as long as it provides supplemental or auxiliary information on the imaging conditions. For example, information representing (i) imaging parameters, including the ID of the user (an operator, a researcher, etc.), the type of sample, the exposure (an aperture value, a sensitivity, an exposure time, etc.) and the focus, (ii) identification information on the sample, and (iii) information specifying or enabling reference to related data, including a type, a position, a condition and a relevant document, may be included. If such information is included, the infrared light reflected by the reflection pattern is auxiliary information calculation light, and an image of the reflection pattern obtained using the auxiliary information calculation light can be regarded as an auxiliary information calculation image. Based on this auxiliary information calculation image, the operation unit calculates imaging conditions. The control unit controls the imaging operation, using the information on the imaging conditions. Since the imaging is controlled based on the auxiliary information as well, it can be performed readily and accurately in accordance with the circumstances. In the above-mentioned embodiment, the reflection pattern provides positional information, the infrared light corresponds to position calculation light, and an image of the reflection pattern is acquired as a position calculation image. The coordinate operation unit 117 (the operation unit) performs calculation and obtains information on the position of the imaging unit 170, based on the image of the reflection pattern. The position control unit 111 (the control unit) controls the position of the imaging unit 170, using the obtained information.

Second Embodiment

The second embodiment of the present invention will be described. In the description below, reference will be made to how the second embodiment differs from the first embodiment. Therefore, the same symbols will be used to denote structural elements similar or corresponding to those of the first embodiment, and a description of such structural elements will be omitted. In the first embodiment, the reflection pattern 801 is drawn on the transparent plate 102 of the observation apparatus 100. In contrast, in the second embodiment, the reflection pattern 801 is not drawn on the transparent plate 102. Instead, a reflection pattern is drawn on the bottom surface of the vessel 310 of the sample 300.

In the second embodiment, a reference position is determined within the range of the vessel 310 of the sample to be measured, and the coordinates of the range inside the vessel 310 can be calculated.

Figure 14:
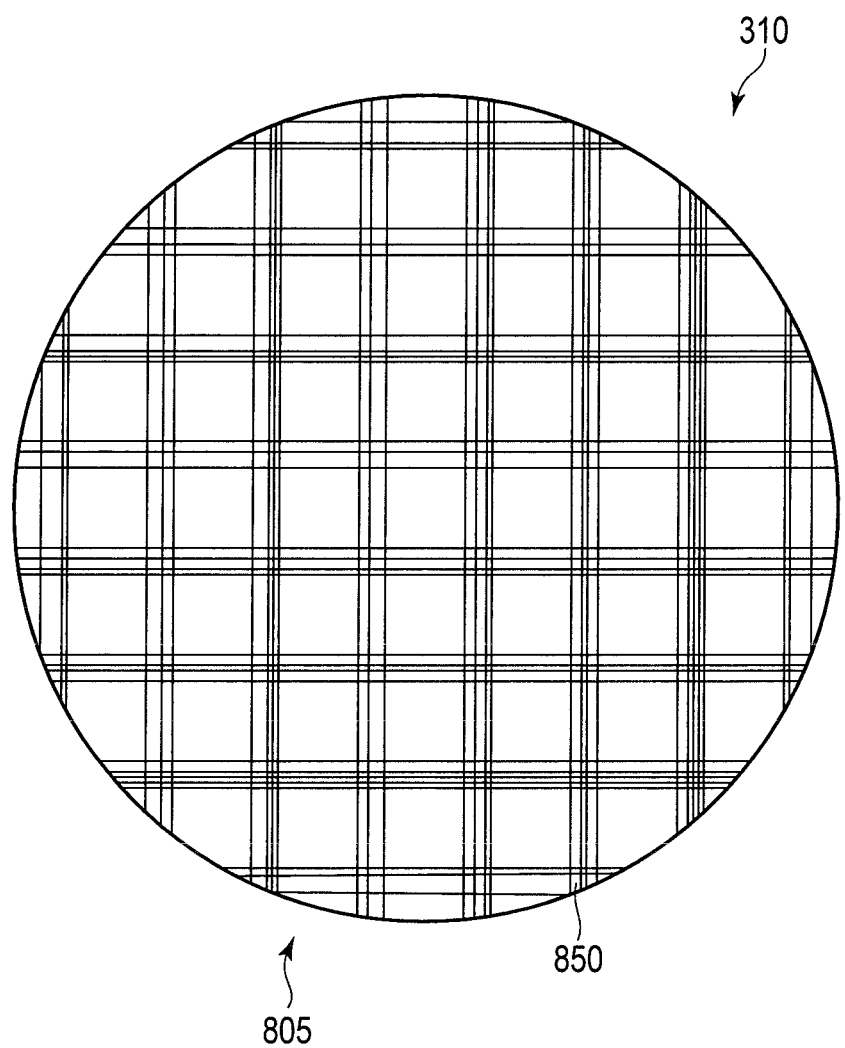
FIG. 14 is a schematic diagram illustrating an example of the reflection pattern of a sample vessel according to the second embodiment.
Figure 15:
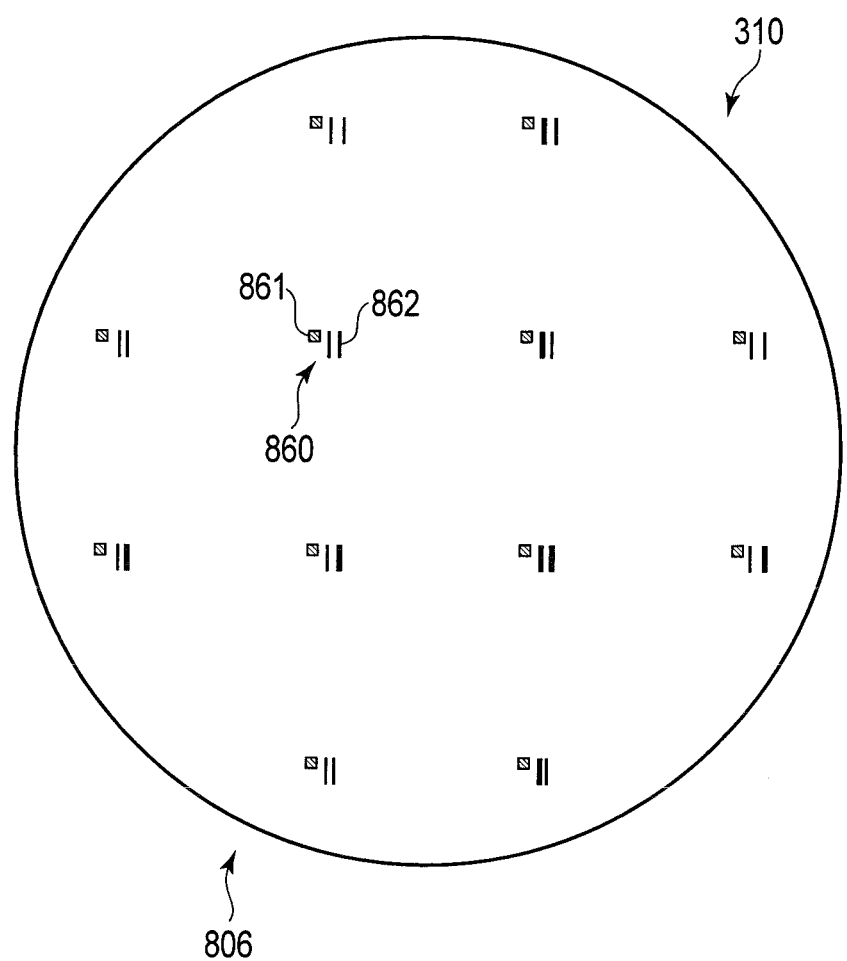
FIG. 15 is a schematic diagram illustrating another example of the reflection pattern of the sample vessel according to the second embodiment.

The reflection pattern drawn on the bottom of the vessel 310 may be, for example, a lattice-like reflection pattern 805, such as that shown in FIG. 14. The lines of the infrared light reflector forming the lattice-like reflection pattern 805 may differ in thickness or form different designs, depending upon the positions. The reflection pattern drawn on the bottom of the vessel 310 may be, for example, a reflection pattern 806 made of discrete dots 861 and bar codes 862, as shown in FIG. 15. The infrared light reflector 860 may include two-dimensional codes in place of the bar codes. Since the position of the sample and the position of the codes are different in the focusing direction when they are imaged, a code image can be deleted utilizing the parallax.

<Modifications>

In connection with the embodiments, a scan is performed in two dimensions, namely, the X and Y directions. Where the image sensor is linear, a one-dimensional scan may be performed in place of the two-dimensional scan. In view of the feature that the imaging unit is mobile, the imaging unit can be applied to an ordinary type of camera or a special type of inspection camera. Even a camera installed in a robot and a camera installed in a drone can detect a specific pattern and a reference image and can take images using them as auxiliary information. These cameras can therefore be regarded as having features of the present invention, namely, an observation apparatus which acquires an observation image of a target object and which comprises: an imaging unit for performing imaging and generating a position calculation image, which is image data of position calculation light, and observation image; and a driving mechanism for moving the imaging unit to change an imaging position of the target object. The cameras mentioned above can also be regarded as an observation apparatus which comprises: a coordinate operation unit for calculating information related to imaging performed by the imaging unit, based on position calculation images taken under different conditions; and a position control unit for controlling the position of the imaging unit, utilizing information relating to the position.

In connection with the above embodiments, reference was made to the case where the observation apparatus 10 processes the images obtained by the imaging unit 170 and analyses the measurement results. However, this is not restrictive. The second control circuit 210 of the controller 200 may perform at least one of these processes if unprocessed data are transmitted from the observation apparatus 100 to the controller 200.

Figure 16:
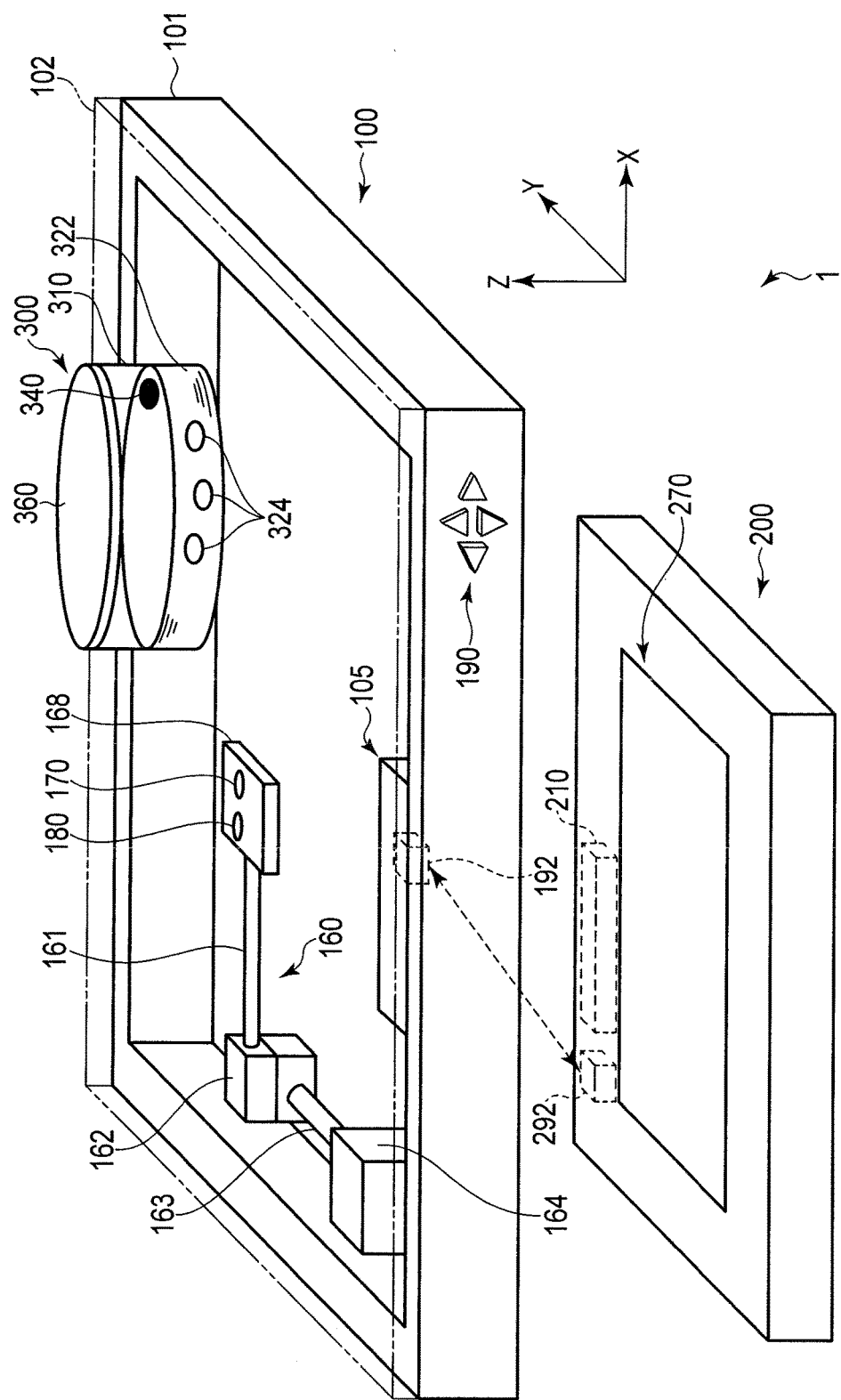
FIG. 16 schematically illustrates an exemplary configuration of a measurement system according to a modification.

In connection with the above embodiments, reference was made to the case where the position of the imaging unit 170 is controlled by the controller 200. However, the present invention is not limited to this. As shown, for example, in FIG. 16, the measurement system 1 may be configured such that the observation apparatus 100 comprises an operation unit 190 having arrow keys, and that the position of the imaging unit 170 is adjusted by operating this operation unit 190.

In connection with the above embodiments, reference was made to the case where the sample is observed using visible light, and information on a reflection pattern is acquired by infrared light. However, the present invention is not limited to this. For example, the sample may be observed using infrared light, and information on a reflection pattern may be acquired by visible light. In this case, a material that allows infrared light to pass therethrough and reflects other light can be used as the wavelength-selective reflecting material with which to form a reflection pattern. The combination of visible light and infrared light is merely an example, and another combination may be used. That is, the light used for observation and the light used for acquiring information on a reflection pattern are only required to have different wavelengths. That is, what is required is that: an observation image is generated based on observation light having a wavelength used for observation, a position calculation image is generated based on position calculation light having a wavelength used for acquiring information on a reflection pattern, and the observation image and the position calculation image are acquired in distinction from each other.

With this configuration, it is possible to provide an observation apparatus which acquires an observation image, image data of observation light used for observation of a target object, and which comprises: an imaging unit for generating images substantially simultaneously; a driving mechanism for moving the imaging unit to change an imaging position of the target object; a coordinate operation unit for calculating information regarding control of the imaging unit, based on auxiliary information calculation images taken under different conditions; and a control unit for controlling the imaging performed by the imaging unit, using information on the imaging position. The position calculation image includes an image of a pattern which allows transmission of at least part of light of the target object image under a specific condition where the auxiliary information calculation light is guided to the imaging unit. The coordinate operation unit calculates information on the position of the imaging unit, based on the pattern.

The reflection pattern may be drawn on a seal to be pasted on the transparent plate 102, the vessel 310 or the like. The seal may be pasted on the transparent plate 102, the vessel 310 or the like, each time the observation apparatus is used.

In the above-mentioned embodiment, reference was made to the case where the transparent plate 102 is placed on top of the casing 101 of the observation apparatus 100, and the sample 300 is placed on top of the casing 101. However, this is not restrictive. The shape of the observation apparatus 100 may be properly modified in accordance with the morphology of the sample 300, the observation direction, or the like. In this case, the position-representing pattern is not limited to a pattern that reflects light of a particular wavelength. The position-representing pattern may be a pattern that guides position calculation light having a specific wavelength toward the imaging unit 170 by allowing transmission of that light to pass. That is, the position-representing pattern may be formed of various kinds of wavelength-selective light guide material.

In connection with the above embodiments, reference was made to the observation apparatus 100 in which the imaging unit 170 is mobile. However, this is not restrictive. What is required is merely that the positional relationship between the imaging unit and the sample (an observation target) varies. That is, the imaging unit may be fixed, and the sample may be made movable by a driving mechanism. In this case, the reflection pattern is provided for the sample.

The characteristics of the reflection pattern, representing coordinate information including line thicknesses and designs, may be the wavelength of light to be reflected, a reflectance, or various other characteristics. For example, where light having wavelengths of a wide range is used as position calculation light, the wavelength of the light reflected by the wavelength-selective light guide material may differ depending upon the coordinates. In such a case, the coordinates can be identified by analyzing the wavelength of the reflected light. If the intensity of the light reflected by the wavelength-selective light guide material differs depending upon the coordinates, the coordinates can be identified by analyzing the intensity of the reflected light.

The above embodiments of the present invention encompass the following inventions:

[1]

An observation apparatus for acquiring an observation image, which is image data of observation light used for observation of a target object, the observation apparatus comprising:

an illumination unit which emits different kinds of light of different wavelengths, including at least (i) position calculation light having a wavelength different from that of the observation light and (ii) the observation light;

an imaging unit which performs imaging and generating at least (i) a position calculation image, which is image data of the position calculation light, and (ii) the observation image;

a driving mechanism which moves the imaging unit to change an imaging position of the target object;

a coordinate operation circuit which calculates information on the position of the imaging unit, based on the position calculation image; and a control circuit which controls the position of the imaging unit, using information on the position.

[2]

The observation apparatus described in [1], wherein the position calculation image includes an image of a pattern which guides the position calculation light to the imaging unit and which is drawn with a wavelength-selective light guide material, and the operation circuit calculates information on the position of the imaging unit, based on the pattern.

[3]

An observation method comprising:

emitting different kinds of light of different wavelengths, including at least (i) observation light used for observation of a target object and (ii) position calculation light having a wavelength different from that of the observation light;

performing imaging and generating at least an observation image, which is image data of the observation light, and a position calculation image, which is image data of the position calculation light;

moving an imaging unit to change an imaging position of the target object;

calculating information on the position of the imaging unit, based on the position calculation image; and controlling the position of the imaging unit, using information on the position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An observation apparatus for acquiring an observation image, which is image data of observation light used for observation of a target object, the observation apparatus comprising:

an imaging unit which performs imaging and generating (i) an auxiliary information calculation image, which is image data of auxiliary information calculation light, and (ii) the observation image;

a driving mechanism which moves the imaging unit to change an imaging position of the target object;

an operation circuit which calculates information regarding imaging conditions of the imaging unit, based on the auxiliary information calculation image taken under different conditions from those of the observation image; and a control circuit which controls the imaging performed by the imaging unit, using information on the imaging conditions, wherein the auxiliary information calculation image includes an image of a pattern which allows transmission of at least part of light according to the observation image under a specific condition where the auxiliary information calculation light is guided to the imaging unit, and the operation circuit calculates information on the imaging conditions, based on the pattern.

2. The observation apparatus according to claim 1, wherein the auxiliary information calculation image includes an image of a pattern which guides the auxiliary information calculation light to the imaging unit, and an image of the pattern and an image of the target object are discriminated from each other where a plurality of images are taken under different imaging conditions.

3. The observation apparatus according to claim 1, wherein the auxiliary information calculation image includes an image of a pattern which guides the auxiliary information calculation light to the imaging unit and which is drawn with a wavelength-selective light guide material, the observation apparatus further comprising an illumination unit for emitting different kinds of light of different wavelengths, including at least (i) the auxiliary information calculation light having a wavelength different from that of the observation light and (ii) the observation light.

4. The observation apparatus according to claim 3, further comprising:

a transparent plate which is configured to hold the target object to be analyzed based on the observation image and on which the pattern is drawn, wherein the wavelength-selective light guide member includes a wavelength-selective reflecting material.

5. The observation apparatus according to claim 3, wherein a relative position between the imaging unit and the illumination unit is fixed, and the driving mechanism moves the imaging unit and the illumination unit integrally.

6. The observation apparatus according to claim 1, wherein portions of the pattern have characteristics indicative of coordinates of the portions, and the operation circuit calculates information on a position of the imaging unit, based on the characteristics.

7. The observation apparatus according to claim 1, further comprising:

a communication device which communicates with an external apparatus, wherein the control circuit controls the imaging, based on a signal received from the external apparatus.

8. A measurement system comprising:

an observation apparatus according to claim 1 and further comprising a communication device; and a controller which communicates with the observation apparatus via the communication device and controls the observation apparatus.

9. An observation apparatus for acquiring an observation image, which is image data of observation light used for observation of a target object, the observation apparatus comprising:

an illumination unit which emits different kinds of light, including at least (i) auxiliary information calculation light having characteristics different from those of the observation light and (ii) the observation light;

a transparent plate which is configured to hold the target object to be analyzed based on the observation image and on which a pattern is drawn using a wavelength-selective reflecting material that reflects the auxiliary information calculation light;

an imaging unit which performs imaging and generating (i) an auxiliary information calculation image, which is image data of auxiliary information calculation light, and (ii) the observation image;

a driving mechanism which moves the imaging unit to change an imaging position of the target object;

an operation circuit which calculates information regarding imaging conditions of the imaging unit, based on the auxiliary information calculation image taken under different conditions from those of the observation image; and a control circuit which controls the imaging performed by the imaging unit, using information on the imaging conditions.

10. An observation method comprising:

causing an imaging unit to perform imaging and generating (i) an observation image, which is image data of observation light, and (ii) an auxiliary information calculation image, which is image data of auxiliary information calculation light and which includes an image of a pattern which allows transmission of at least port of light according to the observation image under a specific condition whether the auxiliary information calculation light is guided to the imaging unit;

moving the imaging unit to change an imaging position of a target object;

calculating information regarding imaging conditions of the imaging unit, based on the auxiliary information calculation image taken under different conditions from those of the observation image; and controlling the imaging performed by the imaging unit, using information on the imaging conditions, based on the pattern.

* * * * *